United States Patent
Deshpande et al.

(10) Patent No.: US 10,805,626 B2
(45) Date of Patent: Oct. 13, 2020

(54) BROADCAST SYSTEM WITH A WATERMARK PAYLOAD

(71) Applicant: Sharp Kabushiki Kaisha, Sakai, Osaka (JP)

(72) Inventors: Sachin G. Deshpande, Camas, WA (US); Kiran Misra, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 144 days.

(21) Appl. No.: 15/781,533

(22) PCT Filed: Dec. 8, 2016

(86) PCT No.: PCT/JP2016/086598
§ 371 (c)(1),
(2) Date: Jun. 5, 2018

(87) PCT Pub. No.: WO2017/099185
PCT Pub. Date: Jun. 15, 2017

(65) Prior Publication Data
US 2018/0376156 A1  Dec. 27, 2018

Related U.S. Application Data

(60) Provisional application No. 62/266,545, filed on Dec. 11, 2015, provisional application No. 62/373,765, filed on Aug. 11, 2016.

(51) Int. Cl.
*H04L 29/06* (2006.01)
*H04N 19/467* (2014.01)
*H04N 21/2362* (2011.01)
*H04N 21/8358* (2011.01)
*H04N 21/235* (2011.01)

(52) U.S. Cl.
CPC ....... *H04N 19/467* (2014.11); *H04N 21/2353* (2013.01); *H04N 21/2362* (2013.01); *H04N 21/8358* (2013.01)

(58) Field of Classification Search
CPC .................................................. H04N 19/467
See application file for complete search history.

(56) References Cited

U.S. PATENT DOCUMENTS

| | | | | |
|---|---|---|---|---|
| 5,956,716 | A * | 9/1999 | Kenner | G06F 16/40 |
| 8,165,343 | B1 * | 4/2012 | McGowan | H04N 21/8456 |
| | | | | 348/461 |
| 9,065,578 | B2 * | 6/2015 | Perret | G10L 19/018 |
| 2002/0012445 | A1 * | 1/2002 | Perry | G06Q 10/00 |
| | | | | 382/100 |
| 2004/0107356 | A1 * | 6/2004 | Shamoon | H04L 63/0428 |
| | | | | 713/193 |
| 2017/0374429 | A1 * | 12/2017 | Yang | H04N 21/4122 |
| 2018/0213266 | A1 * | 7/2018 | Kwak | H04N 21/236 |
| 2018/0242052 | A1 * | 8/2018 | Ng | H04N 21/8358 |

(Continued)

OTHER PUBLICATIONS

Official Communication issued in International Patent Application No. PCT/JP2016/086598, dated Jan. 10, 2017.

(Continued)

*Primary Examiner* — Shawnchoy Rahman
(74) *Attorney, Agent, or Firm* — Keating & Bennett, LLP

(57) ABSTRACT

A system for broadcasting that includes a watermark payload.

7 Claims, 24 Drawing Sheets

(56) References Cited

U.S. PATENT DOCUMENTS

2019/0174204 A1* 6/2019 Deshpande ........ H04N 21/8358

OTHER PUBLICATIONS

Berners-Lee et al., "Uniform Resource Identifier (URI): Generic Syntax", Network Working Group Request for Comments: 3986, Jan. 2005, pp. 1-61.
MPEG-H Systems, "Text of ISO/IEC 2nd CD 23008-1 MPEG Media Transport", ISO/IEC JTC1/SC29/WG11 MPEG/N113293, Jan. 2013, 155 pages.
International Standard, "Information technology—Dynamic adaptive streaming over HTTP (DASH)—Part 1: Media presentation description and segment formats", ISO/IEC 23009-1, Second edition, May 15, 2014, 151 pages.
Berners-Lee et al., "Uniform Resource Identifier (URI): Generic Syntax", Network Working Group Request for Comments: 3986, Jan. 2005, 49 pages.
Oasis, "Common Alerting Protocol", Version 1.2, http://docs.oasis-open.org/emergency/cap/v12/CAP-v1.2-os.html, Jul. 1, 2010, pp. 1-47.
Advanced Television Systems Committee inc., "ATSC-Mobile DTV Standard, Part 4—Announcement", Document A/153 Part 4:2009, Oct. 15, 2009, 39 pages.
Advanced Television Systems Committee, "ATSC Candidate Standard: Content Recovery in Redistribution Scenarios (A/336)", Doc. S33-178r2, Jan. 15, 2016, pp. 1-23.

* cited by examiner

| A | P P P P P P P P P P P P P | I I I I I I I I I I I I I I I I I I I I I I I I I I I I I I I I | R R | A |

0   1                        14 15                                              46  47 48  49

| Y | P P P P P P P P P P P P P | T T T T T T T T T T T T T T T T T T T T T T T T T | D | L L L L L L L L L |

0  1                        14 15                                          39 40 41              49

| Z | MMMM | SSSS | IIIIIIIIIIIIIIIIIIIIIIIIIIIIIIII | RR | A | D | LLLL |
|---|------|------|----------------------------------|----|---|---|------|
| 0 | 1  4 | 5  8 | 9                             40 |41 42|43|44| 45 49 |

| $b_7$ | $b_6$ | $b_5$ | $b_4$ | $b_3$ | $b_2$ | $b_1$ | $b_0$ |
|---|---|---|---|---|---|---|---|
| 0 | 0 | 0 | 1 | 0 | 0 | 0 | 0 |
| 1 | 0 | 0 | 1 | 1 | 0 | 0 | 0 |
| $T_1$ | $T_0$ | pr | $L_4$ | $L_3$ | $L_2$ | $L_1$ | $L_0$ |
| $cid_7$ | $cid_6$ | $cid_5$ | $cid_4$ | $cid_3$ | $cid_2$ | $cid_1$ | $cid_0$ |

SDO_payload ( )  ← Variable length

FIG. 13

| cmdID value | Meaning |
| --- | --- |
| 0x05 | Watermark based interactive services trigger (TDO model) |
| 0x06 | Watermark based interactive services trigger (Direct execution model) |
| 0x07 | Watermark based location of profile, demographics, interest (PDI) table |
| 0x08 | Watermark based location of audience data server |
| 0x09 | Watermark based base URL for Internet delivery of signaling and announcements |

FIG. 14

EA_message{ ← 808
    EA_Expiry (26bits) ~852
    EA_Urgency (1bit) ~854
    EA_message_body_present (1bit) ~856
    reserve (4bits) ~858
    If(EA_message_body_present){ ~860
        EA_message_ID (??bits) ~862
        EA_message_version (??bits) ~864
        EA_message_text_length (8bits) ~866
        EA_message_text (8*Nbits) ~868
    }
} wm_message_block(){ ← 800
    wm_message_id ~802
    ...
    wm_message_bytes() ~804
}

| wm_message_id Value | wm_message() |
|---|---|
| 0x00 | reserved |
| ... | ... |
| 0x05 | EA_message() ~808 |
| 0x08-0x7F | reserved |
| 0x80-0xFF | user private |

```
EA_message{                              ◄─ 808
    EA_Expiry (26bits)                   ── 852
    EA_Urgency (1bit)                    ── 854
    EA_Certainty_severity_code (4bits)   ── 900
    EA_message_body_present (1bit)       ── 856
    If(EA_message_body_present){         ── 860
        EA_message_ID (??bits)           ── 862
        EA_message_version (??bits)      ── 864
        EA_message_text_length (8bits)   ── 866
        EA_message_text (8*Nbits)        ── 868
    }
}
```

```
wm_message_block(){          ◄─ 800
    wm_message_id            ── 802
    ...
    wm_message_bytes()       ── 804
}
```

| wm_message_id Value | wm_message() |
|---|---|
| 0x00 | reserved |
| ... | ... |
| 0x05 | EA_message() ── 808 |
| 0x08-0x7F | reserved |
| 0x80-0xFF | user private |

FIG. 19

| EA_Certainty_severity_code | Certainty | Severity |
|---|---|---|
| 00 00 | Unknown/Unlikely | Unknown/Minor |
| 00 01 | Unknown/Unlikely | Moderate |
| 00 10 | Unknown/Unlikely | Severe |
| 00 11 | Unknown/Unlikely | Extreme |
| 01 00 | Possible | Unknown/Minor |
| 01 01 | Possible | Moderate |
| 01 10 | Possible | Severe |
| 01 11 | Possible | Extreme |

| EA_Certainty_severity_code | Certainty | Severity |
|---|---|---|
| 10 00 | Likely | Unknown/Minor |
| 10 01 | Likely | Moderate |
| 10 10 | Likely | Severe |
| 10 11 | Likely | Extreme |
| 11 00 | Observed | Unknown/Minor |
| 11 01 | Observed | Moderate |
| 11 10 | Observed | Severe |
| 11 11 | Observed | Extreme |

FIG. 20

```
wm_message_block(){          ◀─ 800
    wm_message_id              802
    ...
    wm_message_bytes()         804
}
```

| wm_message_id Value | wm_message() |
|---|---|
| 0x00 | reserved |
| ... | ... |
| 0x05 | EA_message()  ─ 808 |
| 0x08-0x7F | reserved |
| 0x80-0xFF | user private |

805 ─┘     806 ─┘

```
                              ◀─ 808
EA_message(){
    EA_Expiry (32bits)                        ─ 1100
    EA_Urgency (1bit)                         ─ 854
    EA_message_body_present (1bit)            ─ 856
    EA_Certainty_severity_code (4bits)        ─ 900
    reserve (2bits)                           ─ 1104
    If(EA_message_body_present){              ─ 860
        EA_message_ID (??bits)                ─ 862
        EA_message_version (??bits)           ─ 864
        EA_message_text_length (8bits)        ─ 866
        EA_message_text (8*Nbits)             ─ 868
    }
}
```

FIG. 22

| Syntax | No. of Bits | Format |
|---|---|---|
| wm_message_block() { | | |
|     wm_message_id | 8 | uimsbf |
|     ... | | |
|     wm_message_version | 4 | uimsbf |
|     fragment_number | 2 | uimsbf |
|     last_fragment | 2 | uimsbf |
|     wm_message_bytes() | var | |
|     ... | | |
| } | | |

| wm_message_id Value | wm_message() |
|---|---|
| 0x00 | reserved |
| ... | ... |
| 0x03 | uri_message() |
| ... | ... |
| 0x05 | dynamic_event_message() |
| 0x06 | emergency_alert_message() |
| ... | ... |
| 0x08-0x7F | reserved |
| 0x80-0xFF | user private |

FIG. 24B

| Syntax | No. of Bits |
|---|---|
| wm_message() { | |
|     wm_message_block(0) | var |
|     if (last_fragment>0) { | |
|         wm_message_block(1) | var |
|     } | |
|     if (last_fragment>1) { | |
|         wm_message_block(2) | var |
|     } | |
|     if (last_fragment>2) { | |
|         wm_message_block(3) | var |
|     } | |
| } | |

FIG. 24C

| Syntax | No. of Bits | Format |
|---|---|---|
| uri_message() { | | |
|     uri_type | 8 | uimsbf |
|     uri_strlen | 8 | uimsbf |
|     URI_string() | 8*uri_strlen | |
| } | | |

FIG. 24D

| uri_type value | Meaning |
|---|---|
| 0x00 | Reserved |
| 0x01 | Signaling server |
| 0x02 | Electronic Service Guide data server |
| 0x03 | URL of Service Usage Data Gathering Report server |
| ... | ... |
| 0x05-0xFF | Reserved |

FIG. 24E

| Syntax | No. of Bits | Format |
|---|---|---|
| dynamic_event_message() { | | |
|     delivery_protocol_type | 4 | uimsbf |
|     reserved | 4 | '1111' |
|     if (delivery_protocol_type == '1' \|\| '2'){ | | |
|         scheme_id_uri_length (N1) | 8 | uimsbf |
|         scheme_id_uri_string | 8*N1 | |
|         value_length (N2) | 8 | uimsbf |
|         value_string | 8*N2 | |
|         timescale | 32 | uimsbf |
|         presentation_time | 32 | uimsbf |
|         reserved | 6 | '111111' |
|         presentation_time_ms | 10 | |
|         duration | 32 | uimsbf |
|         id | 32 | uimsbf |
|         data_length (N3) | 8 | uimsbf |
|         data | 8*N3 | |
|     } | | |
| } | | |

FIG. 25A

| delivery_protocol_type | Meaning |
|---|---|
| 0 | Reserved |
| 1 | ROUTE/DASH |
| 2 | MMTP |
| 3-15 | Reserved for future use |

FIG. 25B

| Syntax | No. of Bits | Format |
|---|---|---|
| dynamic_event_message() { | | |
|     delivery_protocol_type | 4 | uimsbf |
|     reserved | 4 | '1111' |
|     if (delivery_protocol_type == '1' \|\| '2'){ | | |
|         scheme_id_uri_length (N1) | 8 | uimsbf |
|         scheme_id_uri_string | 8*N1 | |
|         value_length (N2) | 8 | uimsbf |
|         value_string | 8*N2 | |
|         timescale | 32 | uimsbf |
|         presentation_time | 32 | uimsbf |
|         reserved | 6 | '111111' |
|         presentation_time_ms | 10 | |
|         duration | 32 | uimsbf |
|         id | 32 | uimsbf |
|         data_length (N3) | 8 | uimsbf |
|         data | 8*N3 | |
|     } else { | | |
|         proto_reserved_field_length (N1) | 8 | uimsbf |
|         reserved | 8*N1 | '11..' |
|     } | | |
| } | | |

FIG. 25C

| Syntax | No. of Bits | Format |
|---|---|---|
| emergency_alert_message() { | | |
|     CAP_message_ID_length (N1) | 8 | uimsbf |
|     CAP_message_ID | 8*(N1) | |
|     CAP_message_url_length (N2) | 8 | uimsbf |
|     CAP_message_url | 8*(N2) | |
|     expires | 32 | uimsbf |
|     urgency | 1 | bslbf |
|     severity_certainty | 4 | bslbf |
|     reserved | 3 | "111" |
| } | | |

FIG. 26A

| severity_certainty | Certainty | Severity |
|---|---|---|
| '00 00'b | Unknown/Unlikely | Unknown/Minor |
| '00 01'b | Unknown/Unlikely | Moderate |
| '00 10'b | Unknown/Unlikely | Severe |
| '00 11'b | Unknown/Unlikely | Extreme |
| '01 00'b | Possible | Unknown/Minor |
| '01 01'b | Possible | Moderate |
| '01 10'b | Possible | Severe |
| '01 11'b | Possible | Extreme |
| '10 00'b | Likely | Unknown/Minor |
| '10 01'b | Likely | Moderate |
| '10 10'b | Likely | Severe |
| '10 11'b | Likely | Extreme |
| '11 00'b | Observed | Unknown/Minor |
| '11 01'b | Observed | Moderate |
| '11 10'b | Observed | Severe |
| '11 11'b | Observed | Extreme |

FIG. 26B

BROADCAST SYSTEM WITH A WATERMARK PAYLOAD

CROSS REFERENCE TO RELATED APPLICATIONS

This Non-provisional application claims priority under 35 U.S.C. § 119 on U.S. Provisional Patent Application No. 62/266,545, filed on Dec. 11, 2015, and No. 62/373,765, filed on Aug. 11, 2016 the entire contents of which are hereby incorporated by reference.

TECHNICAL FIELD

The present invention relates generally to a system with audio-visual content watermarking.

BACKGROUND ART

In many digital broadcasting systems, a broadcasting station transmits both streams of audio-visual (AV) content and one or more enhanced service data. The enhanced service data may be provided with the AV content to provide information and services or may be provided separately from the AV content to provide information and services.

In many broadcasting environments, the audio-visual content and the one or more enhanced service data is not received directly by an AV presentation device from the broadcasting station. Rather the AV presentation device, such as a television, is typically connected to a broadcast receiving device that receives the audio-visual content and the one or more enhanced service data in a compressed form and provides uncompressed audio-visual content to the AV presentation device.

In some broadcasting environments, the broadcast receiving device receives audio-visual content from a server (sometimes referred to as a Multichannel Video Programming Distributor (MVPD)). The MVPD receives an audio-visual broadcast signal from the broadcasting station, extracts content from the received audio-visual broadcast signal, converts the extracted content into audio-visual signals having a suitable format for transmission, and provides the converted audio-visual signals to the broadcast receiving device. During the conversion process, the MVPD often removes the enhanced service data provided from the broadcasting station or may incorporate a different enhanced service data that is provided to the broadcast receiving device. In this manner, the broadcasting station may provide the audio-visual content with enhanced service data, but the enhanced service data, if any, that is ultimately provided to the AV presentation device and/or the broadcast receiving device may not be the same as that provided by the broadcasting station.

SUMMARY OF INVENTION

Technical Problem

Since the broadcast receiving device extracts audio-visual content from the signal received from the MVPD and provides only uncompressed audio-visual data to the AV presentation device, only enhanced service data provided to the broadcast receiving device is available. Furthermore, the same enhanced service data provided by the broadcasting station may not be provided to the broadcast receiving device and/or AV presentation device.

The foregoing and other objectives, features, and advantages of the invention will be more readily understood upon consideration of the following detailed description of the invention, taken in conjunction with the accompanying drawings.

Solution to Problem

According to one example of the disclosure, a method of processing a data stream comprising: (a) receiving said data stream including a watermark message encoded within said data stream; (b) extracting a corresponding dynamic event message from said watermark message related to a dynamic event; (c) extracting from said dynamic event message a delivery protocol type; (d) determining whether said delivery protocol type is either a 1 or a 2, and if true then a sum of (i) a value of a first field, (ii) a value of a second field, and (iii) a value of a third field is less than or equal to a first threshold value for a 1× video watermark emission format and is less than or equal to a second threshold value for a 2× video watermark emission format; e) based upon said determining when said delivery protocol type is not either a 1 or a 2, then a value of a reserve field length is less than or equal to a third threshold value for said 1× video watermark emission format and is less than or equal to a fourth threshold value for said 2× video watermark emission format and an associated field to said reserve field length indicating a delivery protocol related information; (f) extracting said associated field based upon said reserve field length.

BRIEF DESCRIPTION OF DRAWINGS

FIG. 13 illustrates SDO Private Data.

FIG. 14 illustrates metadata encapsulated within SDO Private data as SDO Payload using cmdID's.

FIG. 18 illustrates an exemplary emergency alert message.

FIG. 19 illustrates another exemplary emergency alert message.

FIG. 20 illustrates an exemplary set of certainty and severity codes.

FIG. 22 illustrates another exemplary emergency alert message.

FIG. 24B is an exemplary mapping of the field wm_message_id to watermark message wm_message( ).

FIG. 24C illustrates an exemplary syntax of wm_message( ).

FIG. 24D illustrates an exemplary syntax of the URI message.

FIG. 24E illustrates an exemplary mapping from value of uri_type field to types of URI.

FIG. 25A illustrates an exemplary dynamic event message.

FIG. 25B illustrates delivery protocol type field encoding.

FIG. 25C illustrates another exemplary dynamic event message.

FIG. 26A illustrates an exemplary syntax of emergency_alert_message( )

FIG. 26B illustrates an exemplary encoding of severity and certainty

DESCRIPTION OF EMBODIMENTS

Definitions

A format of uimsbf represents unsigned integer most significant bit first format.

When the value in Number of bits column equals to var it represents a variable length field.

A reserved field indicates bits corresponding to the field are reserved for future use.

hexadecimal (also base 16, or hex) is a positional numeral system with a radix, or base, of 16. It uses sixteen distinct symbols, most often the symbols 0-9 to represent values zero to nine, and A, B, C, D, E, F (or alternatively a, b, c, d, e, f) to represent values ten to fifteen. Hexadecimal numbers often use the prefix "0x".

$x^y$ when used as to represent an arithmetic operation corresponds to an exponentiation operation i.e. x to the power of y. In other contexts, such notation is used for superscripting not intended for interpretation as exponentiation.

Figure 1:
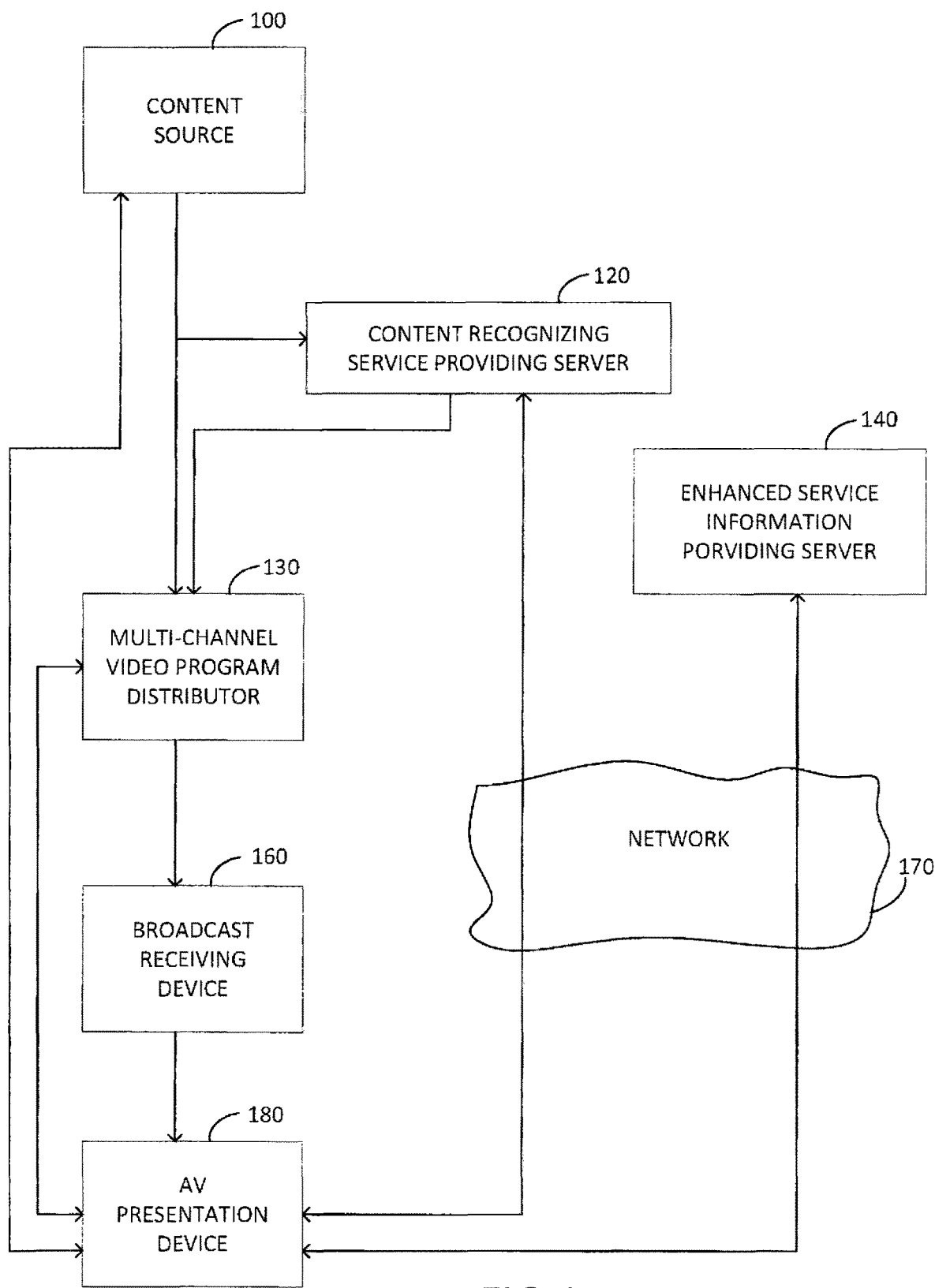
FIG. 1 illustrates a system with enhanced service information.

Referring to FIG. 1, the system may include a content source 100, a content recognizing service providing server 120, a multi-channel video program distributor 130, an enhanced service information providing server 140, a broadcast receiving device 160, a network 170, and an AV presentation device 180.

The content source 100 may correspond to a broadcasting station that broadcasts a broadcast signal including one or more streams of audio-visual content (e.g., audio and/or video). The broadcast signal may further include enhanced services data and/or signaling information. The enhanced services data preferably relates to one or more of the audio-visual broadcast streams. The enhanced data services may have any suitable format, such as for example, service information, metadata, additional data, compiled execution files, web applications, Hypertext Markup Language (HTML) documents, Extensible Markup Language (XML) documents, Cascading Style Sheet (CSS) documents, audio files, video files, Advanced Television Systems Committee (ATSC) 2.0 or future versions contents, and addresses such as Uniform Resource Locator (URL).

The content recognizing service providing server 120 provides a content recognizing service that allows the AV presentation device 180 to recognize content on the basis of audio-visual content from the content source 100. The content recognizing service providing server 120 may optionally modify the audio-visual broadcast content, such as by including a watermark. In some cases, the AV presentation device 180 is a digital video recording device.

The content recognizing service providing server 120 may include a watermark inserter. The watermark inserter may insert watermarks which are designed to carry enhanced services data and/or signaling information, while being imperceptible or at least minimally intrusive to viewers. In other cases a readily observable watermark may be inserted (e.g., readily observable may be readily visible in the image and/or readily observable may be readily audible in the audio). For example, the readily observable watermark may be a logo, such as a logo of a content provider at the upperleft or upper-right of each frame.

The content recognizing service providing server 120 may include a watermark inserter that modifies the audio-visual content to include a non-readily observable watermark (e.g., non-readily observable may be non-readily visible in the image and/or non-readily observable may be non-readily audible in the audio). For example, the non-readily observable watermark may include security information, tracking information, data, or otherwise. Another example includes the channel, content, timing, triggers, and/or URL information.

The multi-channel video program distributor 130 receives broadcast signals from one or more broadcasting stations and typically provides multiplexed broadcast signals to the broadcast receiving device 160. The multi-channel video program distributor 130 may perform demodulation and channel decoding on the received broadcast signals to extract the audio-visual content and enhanced service data. The multi-channel video program distributor 130 may also perform channel encoding on the extracted audio-visual content and enhanced service data to generate a multiplexed signal for further distribution. The multi-channel video program distributor 130 may exclude the extracted enhanced service data and/or may include a different enhanced service data.

The broadcast receiving device 160 may tune to a channel selected by a user and receive an audio-visual signal of the tuned channel. The broadcast receiving device 160 typically performs demodulation and channel decoding on the received signal to extract desired audio-visual content. The broadcast receiving device 160 decodes the extracted audio-visual content using any suitable technique, such as for example, H.264/Moving Picture Experts Group-4 advanced video coding (MPEG-4 AVC), H.265/High efficiency video coding (HEVC), Dolby AC-3, and Moving Picture Experts Group-2 Advanced Audio Coding (MPEG-2 AAC). The broadcast receiving device 160 typically provides uncompressed audio-visual content to the AV presentation device 180.

The enhanced service information providing server 140 provides enhanced service information to audio-visual content in response to a request from the AV presentation device 180.

The AV presentation device 180 may include a display, such as for example, a television, a notebook computer, a digital video recorder, a mobile phone, and a smart phone.

The AV presentation device 180 may receive uncompressed (or compressed) audio-visual or video or audio content from the broadcast receiving device 160, a broadcast signal including encoded audio-visual or video or audio content from the content source 100, and/or encoded or decoded audio-visual or video or audio content from the multi-channel video program distributor 130. In some cases the uncompressed video and audio, may be received via an HDMI cable. The AV presentation device 180 may receive from the content recognizing service providing server 120 through the network 170, an address of an enhanced service relating to the audio-visual content from the enhanced service information providing server 140.

It is to be understood that the content source 100, the content recognizing service providing server 120, the multi-channel video program distributor 130, and the enhanced service information providing server 140 may be combined, or omitted, as desired. It is to be understood that these are logical roles. In some case some of these entities may be separate physical devices. In other cases some of these logical entities may be embodied in same physical device. For example, the broadcast receiving device 160 and AV presentation device 180 may be combined, if desired.

Figure 2:
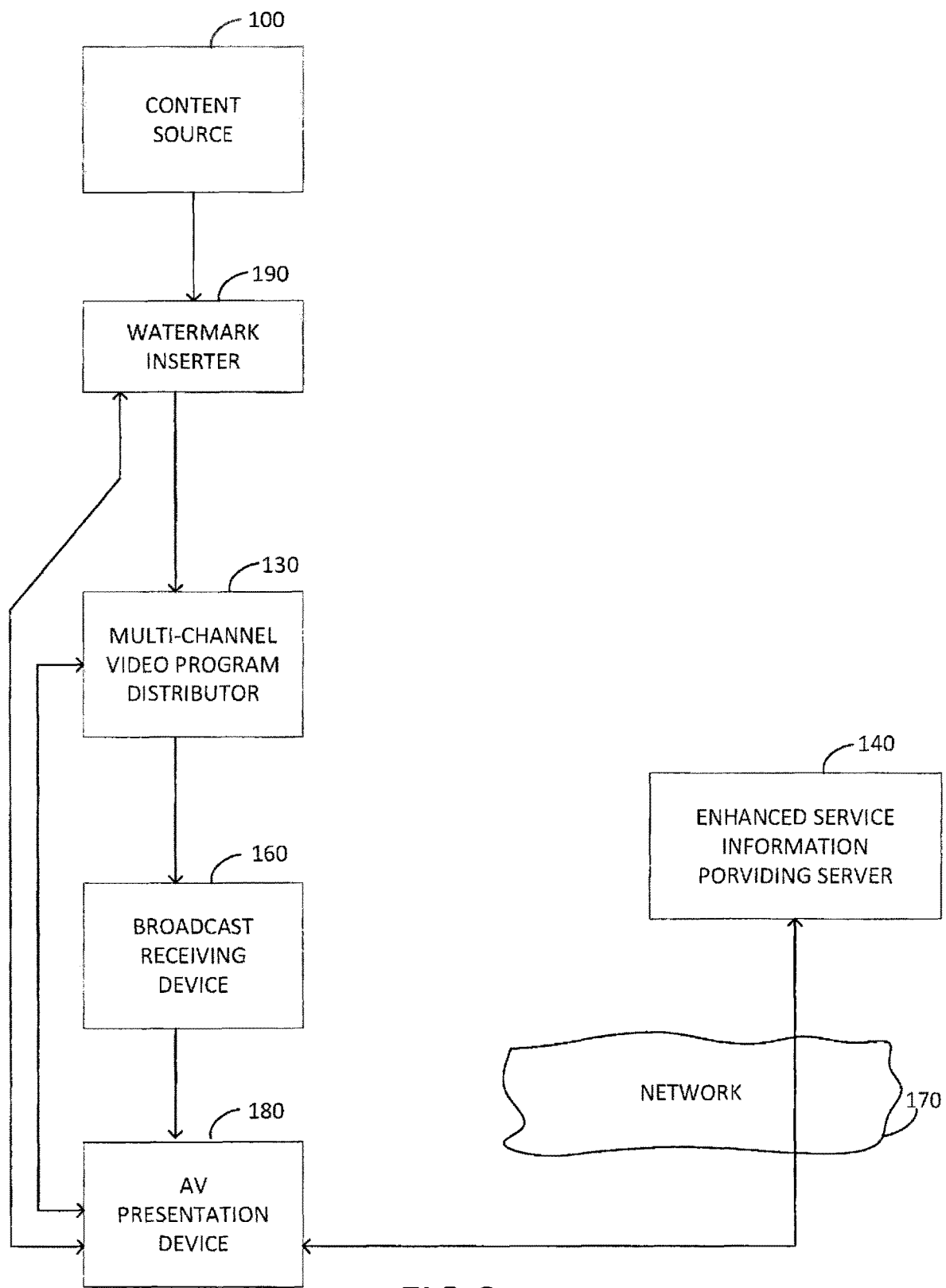
FIG. 2 illustrates another system with enhanced information.

Referring to FIG. 2, a modified system may include a watermark inserter 190. The watermark inserter 190 may modify the audio-visual (e.g., the audio and/or video) content to include additional information in the audio-visual content. The multi-channel video program distribution 130 may receive and distribute a broadcast signal including the modified audio-visual content with the watermark.

The watermark inserter 190 preferably modifies the signal in a manner that includes additional information which is non-readily observable (e.g., visually and/or audibly) in the form of digital information. In non-readily observable watermarking, the inserted information may be readily identifiable in the audio and/or video. In non-readily observable watermarking, although information is included in the audio-visual content (e.g., the audio and/or video), a user is not readily aware of the information.

One use for the watermarking is copyright protection for inhibiting illegal copying of digital media. Another use for the watermarking is source tracking of digital media. A further use for the watermarking is descriptive information for the digital media. Yet another use for the watermarking is providing location information for where additional content may be received associated with the digital media. Yet another use is to identify content and content source that is being viewed and the current time point in the content, and then allowing the device to access the desired additional functionality via an Internet connection. The watermark information is included within the audio-visual content itself, as distinguished from, meta-data that is delivered along with the audio-visual content. By way of example, the watermark information may be included by using a spread spectrum technique, a quantization technique, and/or an amplitude modulation technique.

Figure 3:
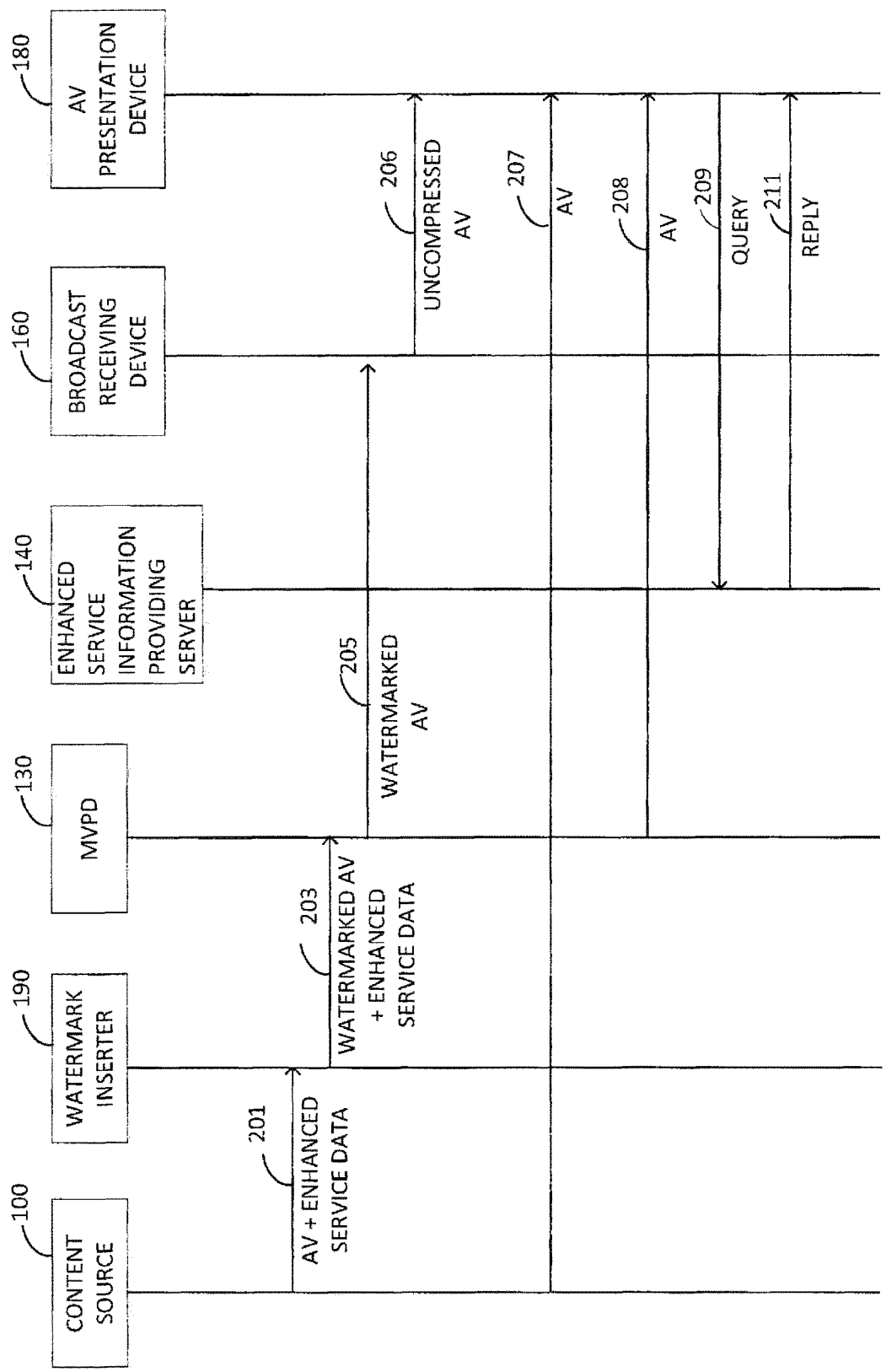
FIG. 3 illustrates a data flow for a system with enhanced information.

Referring to FIG. 3, an exemplary data flow is illustrated. The content source 100 transmits a broadcast signal including at least one audio-visual content and an enhanced service data 201 to the watermark inserter 190.

The watermark inserter 190 receives the broadcast signal that the content source 100 provides and includes a readily observable and/or a non-readily observable watermark in the audio-visual content. The modified audio-visual content with the watermark is provided together with enhanced service data 203 to the MVPD 130.

The content information associated with the watermark may include, for example, identification information of a content provider that provides audio-visual content, audio-visual content identification information, time information of a content section used in content information acquisition, names of channels through which audio-visual content is broadcasted, logos of channels through which audio-visual content is broadcasted, descriptions of channels through which the audio-visual content is broadcasted, a usage information reporting period, the minimum usage time for usage information acquisition, statistics for sporting events, display of useful information, widgets, applications, executables, and/or available enhanced service information relating to audio-visual content.

The acquisition path of available enhanced service data may be represented in any manner, such an Internet Protocol based path or Advanced Television Systems Committee—Mobile/Handheld (ATSC M/H).

The MVPD 130 receives broadcast signals including watermarked audio-visual content and enhanced data service and may generate a multiplexed signal to provide it 205 to the broadcast receiving device 160. At this point, the multiplexed signal may exclude the received enhanced service data and/or may include a different enhanced service data.

The broadcast receiving device 160 may tune to a channel that a user selects and receives signals of the tuned channel, demodulates the received signals, performs channel decoding and audio-video decoding on the demodulated signals to generate an uncompressed audio-video content, and then, provide 206 the uncompressed audio-visual content to the AV presentation device 180. The content source 100 may also broadcast 207 the audio-visual content through a channel to the AV presentation device 180. The MVPD 130 may directly transmit 208 a broadcast signal including audio-visual content to the AV presentation device 180 without going through the broadcast receiving device 160. In yet another case some of the AV information may be sent to the AV presentation device 180 over a broadband connection. In some cases this may be a managed broadband connection. In another case it may be an unmanaged broadband connection.

The AV presentation device 180 may receive uncompressed (or compressed) audio-visual content from the broadcast receiving device 160. Additionally, the AV presentation device 180 may receive a broadcast signal through a channel from the content source 100, and then, may demodulate and decode the received broadcast signal to obtain audio-visual content. Additionally, the AV presentation device 180 may receive a broadcast signal from the MVPD 130, and then, may demodulate and decode the received broadcast signal to obtain audio-visual content. The AV presentation device 180 (or broadcast receiving device 160) extracts watermark information from one or more video frames or a selection of audio samples of the received audio-visual content. The AV presentation device 180 may use the information obtained from the watermark(s) to make a request 209 to the enhanced service information providing server 140 (or any other device) for additional information. The enhanced service information providing server 140 may provide, in response thereto a reply 211.

Figure 4:
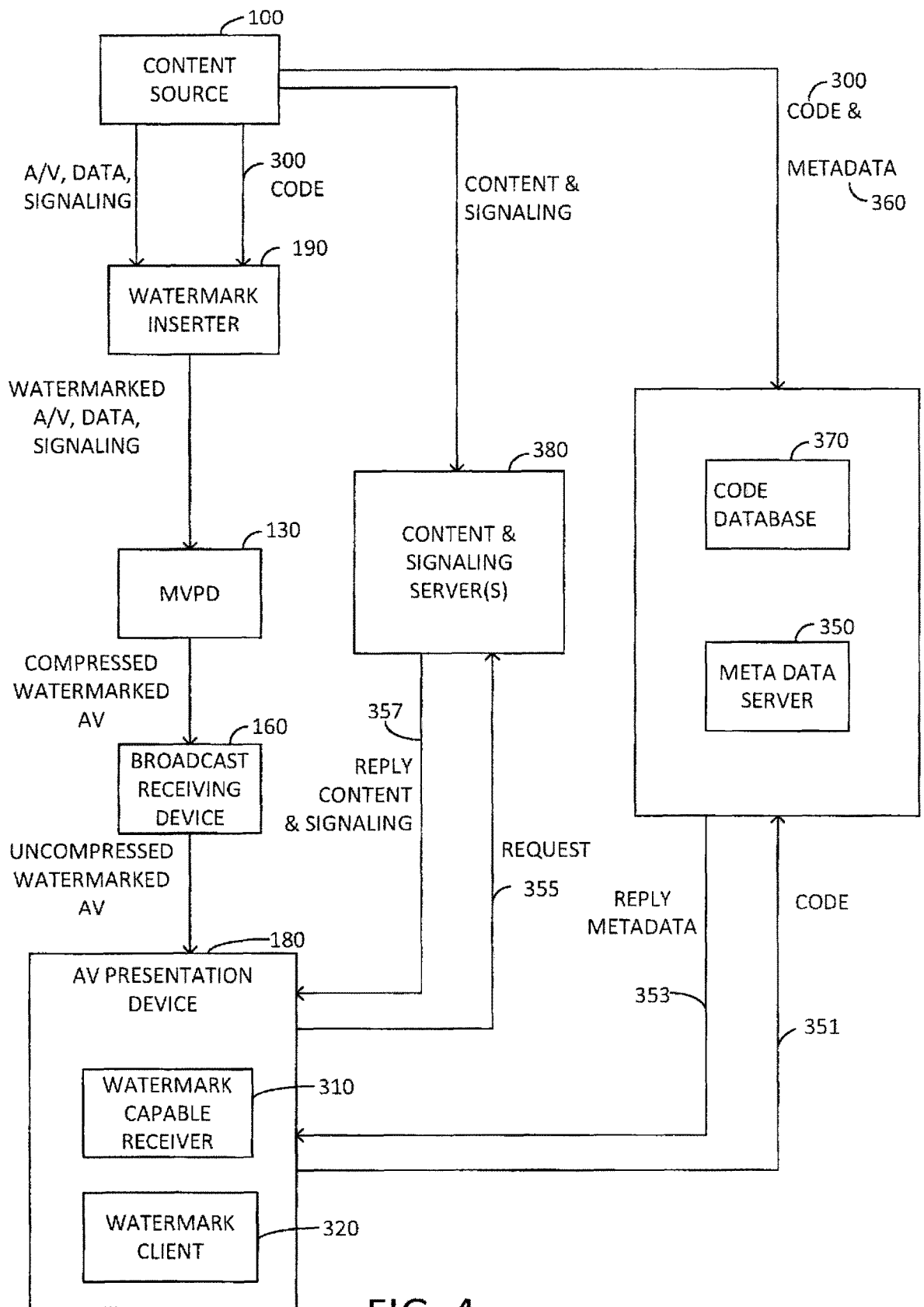
FIG. 4 illustrates another system with enhanced information.

Referring to FIG. 4, a further example includes the content source 100 that provides audio-visual content together with enhanced service data (if desired) to the watermark inserter 190. In addition, the content source 100 may provide a code 300 to the watermark inserter 190 together with the audio-visual content. The code 300 may be any suitable code to identify which, among a plurality of audio-visual streams, should be modified with the watermark. For example code=1 may identify the first audio-visual stream, code=2 may identify the second audio-visual stream, code=3 may identify the fourth audio-visual stream from ABC, code=4 may identify the fourth audio-visual stream from National Broadcasting Company (NBC), etc. The code may include temporal location information within the audio-visual content. The code may include other metadata, if desired.

The watermarked audio-visual content and associated data, signaling is provided by the watermark inserter 190 to the MVPD, which in turn may provide the watermarked compressed audio-visual content to the broadcast receiving device 160 (e.g., a set top box). The broadcast receiving device 160 may provide watermarked audio-visual content (e.g., typically uncompressed) to the AV presentation device 180. The AV presentation device 180 may include a watermark capable receiver 310 together with a watermark client 320. The watermark capable receiver 310 is suitable to detect the existence of the watermark within the audio-visual content, and to extract the watermark data from within the audio-visual content. The watermark client 320 is suitable to use the data extracted from the watermark to request additional data based thereon, and subsequently use this additional data in a suitable manner.

The AV presentation device 180 may use the code 300 from the extracted watermark to make a request to a metadata server 350. A code database 370 receives the data from the content source 100 that includes the code 300 and associated metadata 360. The code 300 and associated metadata 360 is stored in the code database 370 for subsequent use. In this manner, the code 300 that is provided to the watermark inserter 190 which is encoded within the audio-visual content is also stored in the code database 370 together with its associated metadata 360. In the event that the MVPD 130, or otherwise, removes the associated metadata or otherwise changes the associated metadata, it is recoverable by the AV presentation device 180 from the metadata server 350 which uses the provided code 351 to query the code database 370 and provide an associated response with the metadata 353 to the AV presentation device 180. The reply metadata provided by the metadata server 350 is used by the AV presentation device 180 to form a request 355 that is provided to the content and signaling server 380. The content and signaling server 380, in response to the request, provides selected content and signaling 357 to the AV presentation device 180. In general, the content and signaling server 380 may be different from the metadata server 350.

However, making a first request to the metadata server to obtain a response to the code provided, then subsequently using the metadata to provide a request to the content and signaling server 380 is burdensome, and prone to failure, due to the two different servers and/or requests that are utilized. Additionally it may increase the latency.

By way of example, the metadata may consist of one or more of the following syntax elements:

(1) location of content and signaling server (e.g., where is the server, such as its network address. Examples of network addresses are domain names, IPv4 address etc.);

(2) protocol to be used for communication with the content and signaling server (e.g., Hypertext Transfer Protocol—http, Hypertext Transfer Protocol Secure—https etc.);

(3) time code identifying a temporal location in the audio-visual content (e.g., where the metadata should be associated with in the audio-visual content);

(4) time sensitive event trigger (e.g., an advertisement or an event for a particular location in the audio-visual content);

(5) channel identification (e.g., channel specific information; local channel content);

(6) duration over which the content and signaling server requests are randomly carried out by client (e.g., for load balancing). For brevity, this syntax element may also be referred to as duration for content server requests;

(7) etc.

The watermark(s) embedded in the audio-video content typically have a capacity to carry only a few bits of payload information when the watermarked audio-video broadcast has non-readily observable information. For relatively small payload sizes, the time code (element 3 above) and/or the location of the content and signaling server (element 1 above) tends to take on a significant percentage of the available payload leaving limited additional payload for the remaining data, which tends to be problematic.

To include sufficient metadata within the watermark, so that both the time code and the location information may be provided together with additional information, it may be desirable to partition the metadata across multiple watermark payloads. Each of the watermark payloads is likewise preferably included within different portions of the audio-visual content. The data extracted from the multiple watermark payloads are combined together to form a set of desirable information to be used to make a request. In the description below the term payload may be used to indicate watermark payload. Each of the syntax elements may be included within a single payload, spanned across multiple payloads, and/or fragmented across multiple payloads. Each payload may be assigned a payload type for purposes of identification. Further, an association may be established between multiple payloads belonging to the same or approximately the same timeline location. Also, the association may be uni-directional or bi-directional, as desired.

The desired time code data may be obtained from payload(s) that span across several temporal locations of the audio-visual content. Therefore some systems may establish rules to associate the determined time code with a particular temporal location of the audio-visual content. In an example the chosen temporal location may correspond to the temporal location at the end of a pre-determined watermark payload.

For example, the payload size may be 50 bits while the desirable metadata may be 70 bits, thus exceeding the payload size of a single watermark. An example of the desirable metadata may be as follows:

| | |
|---|---|
| Location of content and server (I) | 32 bits (Internet Protocol "IP" address) |
| Application layer protocol (A) | 1 bit (http/https) |
| Time code (T) | 25 bits (for 1 year of uniqueness with a granularity of 1 second) |
| Time sensitive trigger (D) | 1 bit (A value of 1 indicates the AV presentation device should query for interactive content. A value of 0 indicates the AV presentation device should not query for interactive content (e.g. as in time base trigger)). |
| Channel identification (L) | 9 bits |
| Duration for content server requests (R) | 2 bits |

Another example of the desirable metadata may be as follows:

| | |
|---|---|
| Location of content and server (I) | 32 bits (IP address) |
| Application layer protocol (A) | 2 bit (00 = http/01 = https, 10 = reserved, 11 = reserved) |

| | |
|---|---|
| Time code (T) | 25 bits (for 1 year of uniqueness with a granularity of 1 second) |
| Time sensitive trigger (D) | 1 bit |
| Channel identification (L) | 9 bits |
| Duration for content server requests (R) | 2 bits |

One manner of partitioning the metadata is to include the content and signal server communication information (CSSCI) in one payload and timeline information in another payload. The CSSCI payload may include, for example, where information (e.g., location of content and signaling server), association information (e.g., an identifier to associate the CSSCI payload with one or more other payloads), and how information (e.g., application layer protocol, duration for content server requests). The timeline information may include, for example, association information (e.g., an identifier to associate the timeline with one or more other payloads), when information (e.g., time code information), and which information (e.g., channel identification).

Figures 5, 6, 7:
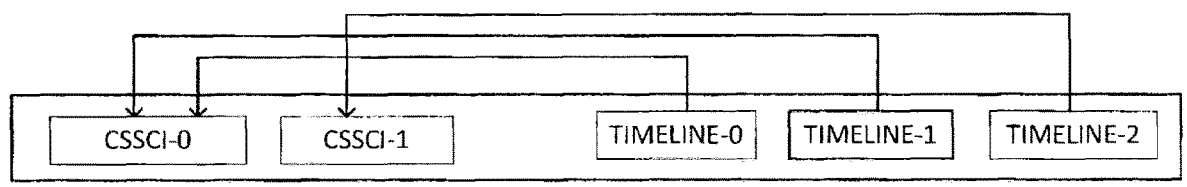
FIG. 5 illustrates a watermark payload.
FIG. 6 illustrates another watermark payload.
FIG. 7 illustrates relationships between watermark payloads.

Referring to FIG. 5, an exemplary CSSCI payload is illustrated.

Referring to FIG. 6, an exemplary time location payload is illustrated. The term time location may be alternatively used in place of the term temporal location.

The payload type may be identified by the first bit, "Y". When Y is set to 0 the payload corresponds to CSSCI payload and the 14 bit payload identifier (P) is used to label the CSSCI. When Y is set to 1 the payload corresponds to the temporal location payload and the 14 bit payload identifier (P) signals the corresponding CSSCI. As a result, different payload types with same payload identifier (P) value are associated with each other. The identifier R indicates a time duration over which to spread the content and signaling server requests. In yet another example "Y" may correspond to a 2-bit field where the value 00 indicates a CSSCI payload, the value 01 indicates a temporal location payload and the values 10, 11 are reserved for future use.

Referring to FIG. 7, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads.

As illustrated, each temporal location payload is associated with a previously received CSSCI type payload, and thus unidirectional in its association. In the event that a previous CSSCI type payload matching a temporal location payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

Figure 8:
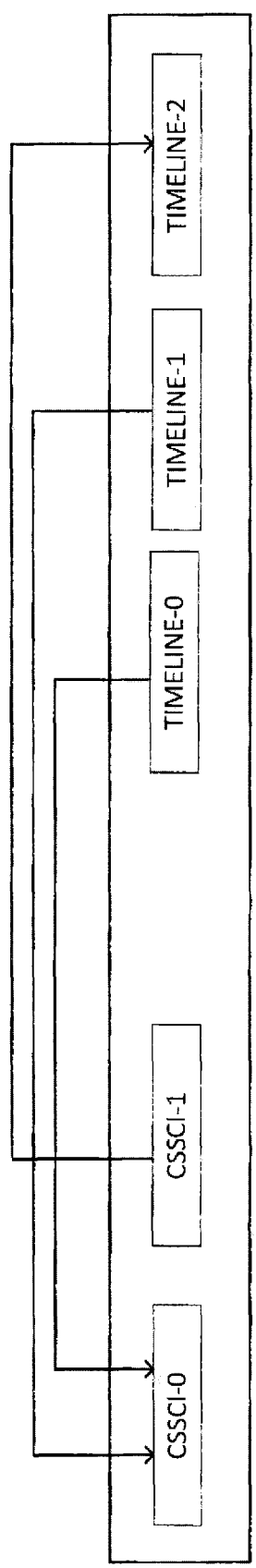
FIG. 8 illustrates relationships between watermark payloads.

Referring to FIG. 8, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads. As illustrated, two of the temporal location payloads are associated with a previously received CSSCI type payload, and one of the CSSCI type payloads are associated with a subsequently received Temporal location payload, and thus bidirectional in its association. In the event that a corresponding CSSCI type payload matching a temporal location payload is not available, then the system may be able to determine that a packet has been lost or otherwise the watermarking was not effective. Similarly, in the event that a corresponding timeline type payload matching a CSSCI payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

In an example, a CSSCI type payload (e.g. CSSCI-0) has two sets of association information P0 and P1. A time location payload, e.g. Timeline-0, has two sets of association information P0 and P1 that matches the association information P0 and P1 for CSSCI-0. In this example a bidirectional association exists for the pair CSSCI-0, Timeline-0 where P0 points to CSSCI-0 and P1 points to Timeline-0.

The number of bits assigned to the payload identifier (P) may be modified, as desired (e.g., for a desired robustness). Similarly, the number of bits assigned to I, A, T, D, L, and R may be modified, as desired.

Figure 9:
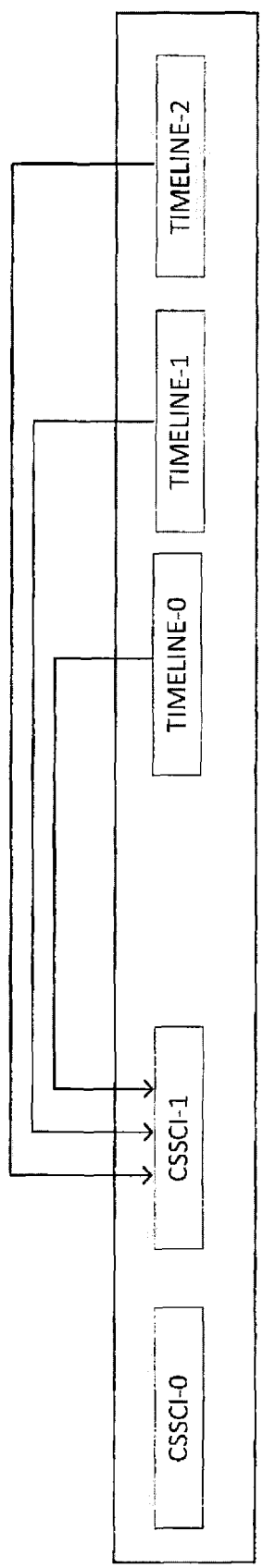
FIG. 9 illustrates relationships between watermark payloads.

In an example, the AV presentation device 180 may maintain a list denoted by a variable listC of "c" most recently received CSSCI payload(s). "c" may be provided in the watermark, if desired, or otherwise set by the system. In this manner, the AV presentation device 180 may only have to maintain a limited number of CSSCI payloads in memory. In the case that c=1, then once a CSSCI payload is received it remains in effect until another CSSCI payload is received, as illustrated in FIG. 9. A loss of a CSSCI payload may be detected using the payload identifier (P), for example, the temporal location payload contains a P that does not correspond to any of the CSSCI payloads in listC. In this manner, the same user experience may be achieved across different AV presentation devices 180.

In an example, the AV presentation device 180 may maintain more than one list of received CSSCI payload(s). Each list may differ in size and may be maintained (i.e. addition/removal of entries within the list) using a differing set of rules. It is to be understood, that this does not preclude the possibility that a subset of lists may have same size and/or same maintenance rules. As an example, there may be two lists maintained by 180 where one list contains "c1" most recently received CSSCI payload(s) where each payload is received at an interval of "0" CSSCI payload(s); while the other list contains "c2" most recently received CSSCI payload(s), where each payload is received at an interval of "d" CSSCI payload(s).

Figure 10:
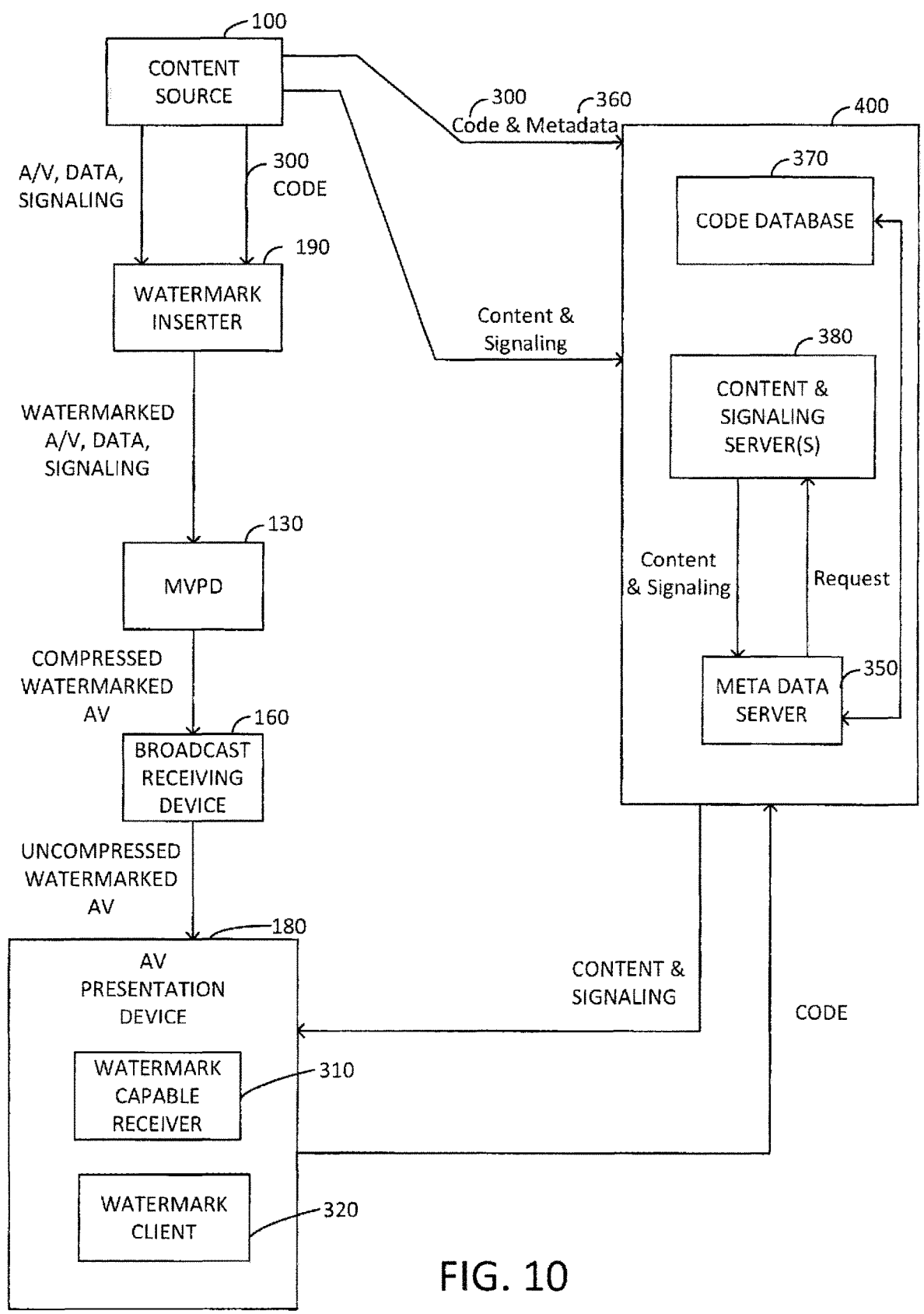
FIG. 10 illustrates another system with enhanced information.

Referring to FIG. 10, a modified system may include the content source 100, the watermark inserter 190, the MVPD 130, the broadcast receiving device 160, and the AV presentation device 180 together with its watermark capable receiver 310 and watermark client 320. The content server 400 may be modified to include the code database 370, the metadata server 350, and the content and signaling server(s) 380. The code 300 and metadata 360 is provided to the content server 400 by the content source 100. The content and signaling data is provided to the content and signaling server(s) 390.

The AV presentation device 180 may provide a code in a request based upon the decoded one or more watermarks from the audio-video broadcast. The content server 400 receives the request with the code from the AV presentation device 180. The metadata server 380 then parses the received code request and based upon information from the code database 370, makes a request to the content and signaling server(s) 390 to determine the content and signaling information which is then provided to the AV presentation device 180. In this manner, the AV presentation device 180 only needs to make a single request to a single content server 400, which in turn provides the response to the AV presentation device 180. It is to be understood that the different functions of the content server 400 may be achieved by combining the existing functions together, separating the existing functions into more components, omitting components, and/or any other technique.

A http/https request URL (that will be sent to the content server 400) corresponding to payload(s) in FIG. 5 and FIG. 6, when time sensitive trigger D equals to 1, may be defined as:
If A is equal to 0 then the http request URL is:
http://IIIIIIII.IIIIIIII.IIIIIIII.IIIIIIII/
LLLLLLLLL?time=TTTTTTTTTTTTTTTTTTTTT TTTTT
Otherwise, the https request URL is:
https://IIIIIIII.IIIIIIII.IIIIIIII.IIIIIIII/
LLLLLLLLL?time=TTTTTTTTTTTTTTTTTTTTT TTTTT
where IIIIIIII.IIIIIIII.IIIIIIII.IIIIIIII above corresponds to the 32-bit IP address signaled in CSSCI payload.

In an example, the subset of URL that specifies information such as: the content server location, the communication protocol, communication port, the login information, the folder on the content server are carried in a designated payload type.

In some implementations a value of a syntax element may be derived using a decoding process which may access information spanning multiple payloads. For example, the time code may be fragmented into multiple watermark payloads and then reassembled to construct a complete time code. In an example, the time code may correspond to a temporal location within the audio-visual content. In an example, the time code may correspond to timeline data of the audio-visual content.

For example, the payload size may be 50 bits while the desirable metadata may be 66 bits, thus exceeding the payload size of a single watermark. An example of the desirable metadata may be as follows:

| | |
|---|---|
| Location of content and server (I) | 32 bits (IP address) |
| Application layer protocol (A) | 1 bit (http/https) |
| Time code (T) | 25 bits (for 1 year of uniqueness with a granularity of 1 second) |
| Time sensitive trigger (D) | 1 bit |
| Channel identification (L) | 5 bits |
| Duration for content server requests (R) | 2 bits |

Another example of the desirable metadata may be as follows:

| | |
|---|---|
| Location of content and server (I) | 32 bits (IP address) |
| Application layer protocol (A) | 2 bit (00 = http/01 = https, 10 = reserved, 11 = reserved) |
| Time code (T) | 25 bits (for 1 year of uniqueness with a granularity of 1 second) |
| Time sensitive trigger (D) | 1 bit |
| Channel identification (L) | 5 bits |
| Duration for content server requests (R) | 2 bits |

Figures 11, 12:
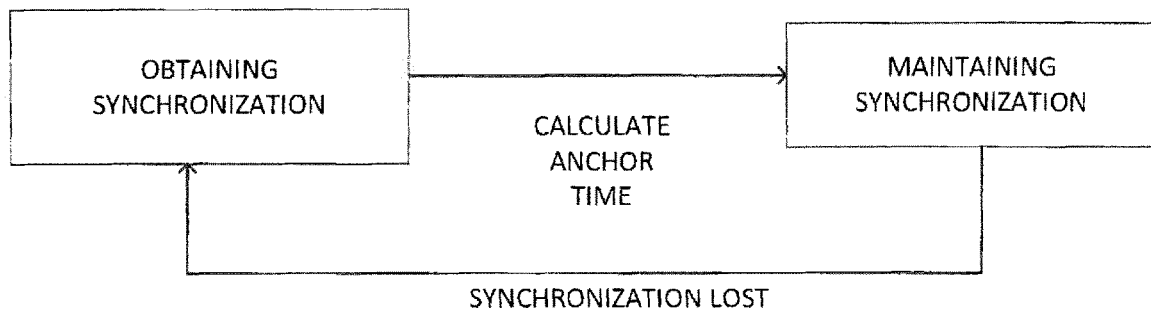
FIG. 11 illustrates obtaining synchronization and maintaining [FIG. 1] synchronization.
FIG. 12 illustrates another watermark payload.

Referring to FIG. 11, a state transition diagram illustrates one technique to calculate the time code. To obtain a time code synchronization a number of consecutive payloads starting with a payload type "start sync", is followed by payloads of type "not start sync", with a total being equal to "r". By using the total of "r" consecutive payloads, each having some time information contained therein, the time synchronization may be determined by calculating an anchor time. After calculating the anchor time code, the time code may be updated by receiving additional payloads that include partial time code information therein in such a manner that does not require receiving another total of "r" consecutive payloads to determine the next time code. One technique to achieve this time synchronization is to partition the time code in consecutive payloads and an incremental time code in each of the consecutive payloads. When the synchronization is lost, such as by changing the channel, the obtain synchronization process is performed. A video display device when first turned ON enters the initial "obtaining synchronization" state.

Referring to FIG. 12, an exemplary structure of a watermark payload is illustrated. Z indicates the payload type, where Z equal to 1 indicates the start of the time sync and Z equal to 0 indicates not start of time sync. S indicates the time sync payload bits used in determining absolute time code. M indicates the time sync payloads bits used in maintaining the time code.

By way of example, the AV presentation device 180 may receive n=7 consecutive watermark payloads where the first payload has Z=1 while the subsequent watermark payloads have Z=0. The bits corresponding to "SSSS" are extracted from $(t-n+1)^{th}$ to $t^{th}$ watermark payload and concatenated together to obtain a 28 bit representation of the time code "$T_t$" of a temporal location. The anchor time code "$C_t$" is also set to "$T_t$". "$T_t$" may be represented as $SSSS_{z=1,t-n+1} \ldots SSSS_{z=0,t-1} SSSS_{z=0,t}$; "$C_t$"="$T_t$". In another example, constants may be added (to select a future time) and/or multiplied (to change the granularity) to the derived values. In yet another alternative example, the derived values are mapped to another value by use of a mapping function.

Once the initialization synchronization is obtained, the anchor time and payload time are updated using each payload. This may be performed, for example, as follows:

$$T_t = f(C_{t-1}, MMMM_t)$$

$$C_t = g(T_t)$$

Where, f represents a mapping function that takes as input 2 values and outputs 1 value; g represents a mapping function that takes as input 1 value and outputs 1 value; / represents integer division with truncation of the result toward zero, For example, 7/4 and −7/−4 are truncated to 1 and −7/4 and 7/−4 are truncated to −1. In an example:

$$T_t = C_{t-1} + MMMM_t$$

$$C_t = T_t$$

As described above, every "n" payloads the anchor time may also be determined using the bits corresponding to "SSSS". The anchor time determined using "SSSS" must match the anchor time derivation above and can be used to verify the correctness of the maintained time code.

Since the watermark may span a non-zero time, the temporal location of the time code $T_t$ may be determined by a set of rules, such as for example, $T_t$ may correspond to a time instant at the end of the t-th watermark payload.

It is to be understood that multiple syntax elements may be combined to form the code. The code may then be mapped either by the AV presentation device 180 or using another server to different syntax element values. For example, the server information (e.g., location of the content and signaling server(s) and/or application layer protocol, etc.) and time code is combined into a single code. The single code is then mapped to a temporal location in the uncompressed audio-video stream, and location of the content and signaling server(s). In this manner, a single request may be made to the server for additional information.

A limited number of bits may be used for the time code, in such a manner to permits collisions in the time code. For example, using 20 bits for the timecode allows for at most 12 days of uniqueness at a granularity of 1 second. After 12 days the codespace corresponding to the timecode will be reused tending to result in collisions.

In one example the watermark payload may be encapsulated within a Standards Developing Organization (SDO) Private data command as SDO Payload using cmdID's. As an example the watermark payload of FIG. 5 or FIG. 6 maybe encapsulated as SDO payload. A cmdID value 0x05 may refer to a watermark based interactive services trigger (triggered declarative object—TDO Model). A cmdID value 0x06 may refer to a watermark based interactive services trigger (direct execution model). This facilitates the re-use of existing segmentation and reassembly modules built for trigger transportation. The segmented command may be embedded in watermarks, if desired. The SDO Private data may be desired, such as illustrated in FIG. 13, where the packet is included as part of SDO_payload( ). In some examples the watermark payload received in this manner maybe passed to an entity/module in the receiver which handles these defined cmdID types. Then segmentation and reassembly functionality of that module could be reused if watermark payload packet needs to be split into multiple packets—depending upon the selected watermark scheme's capacity in terms of number of bits.

Parameter type T is a 2-bit field that indicates whether the instance of the SDOPrivatedata command is part of a segmented variable length command, as defined in Section 7.1.11.2 of CEA-708 ("CEA: "Digital Television (DTV) Closed Captioning, CEA-708-E, Consumer Electronics Association, June 2013"), and if so, whether the instance is the first, middle, or last segment. The Type field in the SDOPrivateData command is encoded as specified in Section 7.1.11.2 of CEA-708. pr is a flag that indicates, when set to '1', that the content of the command is asserted to be Program Related. When the flag is set to '0', the content of the command is not so asserted. Length (L) is an unsigned integer that indicates the number of bytes following the header, in the range 2 to 27, and is represented in the SDOPrivateData command as the set of bits L4 through L0 where L4 is the most significant and L0 is the least significant. cid (cmdID) is an 8-bit field that identifies the SDO that has defined the syntax and semantics of the SDO_payload( ) data structure to follow. The metadata may be encapsulated within SDO Private data as SDO Payload using cmdID's as shown in FIG. 14.

The payload defined in FIG. 5 and FIG. 6 may be encapsulated within a Standards Developing Organization (SDO) Private data (SDOPrivateData) command as SDO Payload using cmdID's. A cmdID value 0x05 and 0x06 may refer to encapsulation of payloads defined in FIG. 5 and FIG. 6 respectively. This facilitates the re-use of existing segmentation and reassembly modules built for trigger transportation. The segmented command may be embedded in watermarks, if desired. The SDO Private data may be desired, such as illustrated in FIG. 13, where the payload packet is included as part of SDO_payload( ).

The payload defined in FIG. 12 may be encapsulated within a Standards Developing Organization (SDO) Private data command as SDO Payload using cmdID's. A cmdID value 0x05 may refer to encapsulation of payload defined in FIG. 12. This facilitates the re-use of existing segmentation and reassembly modules built for trigger transportation. The segmented command may be embedded in watermarks, if desired. The SDO Private data may be desired, such as illustrated in FIG. 13, where the packet is included as part of SDO_payload( ).

Figure 15:
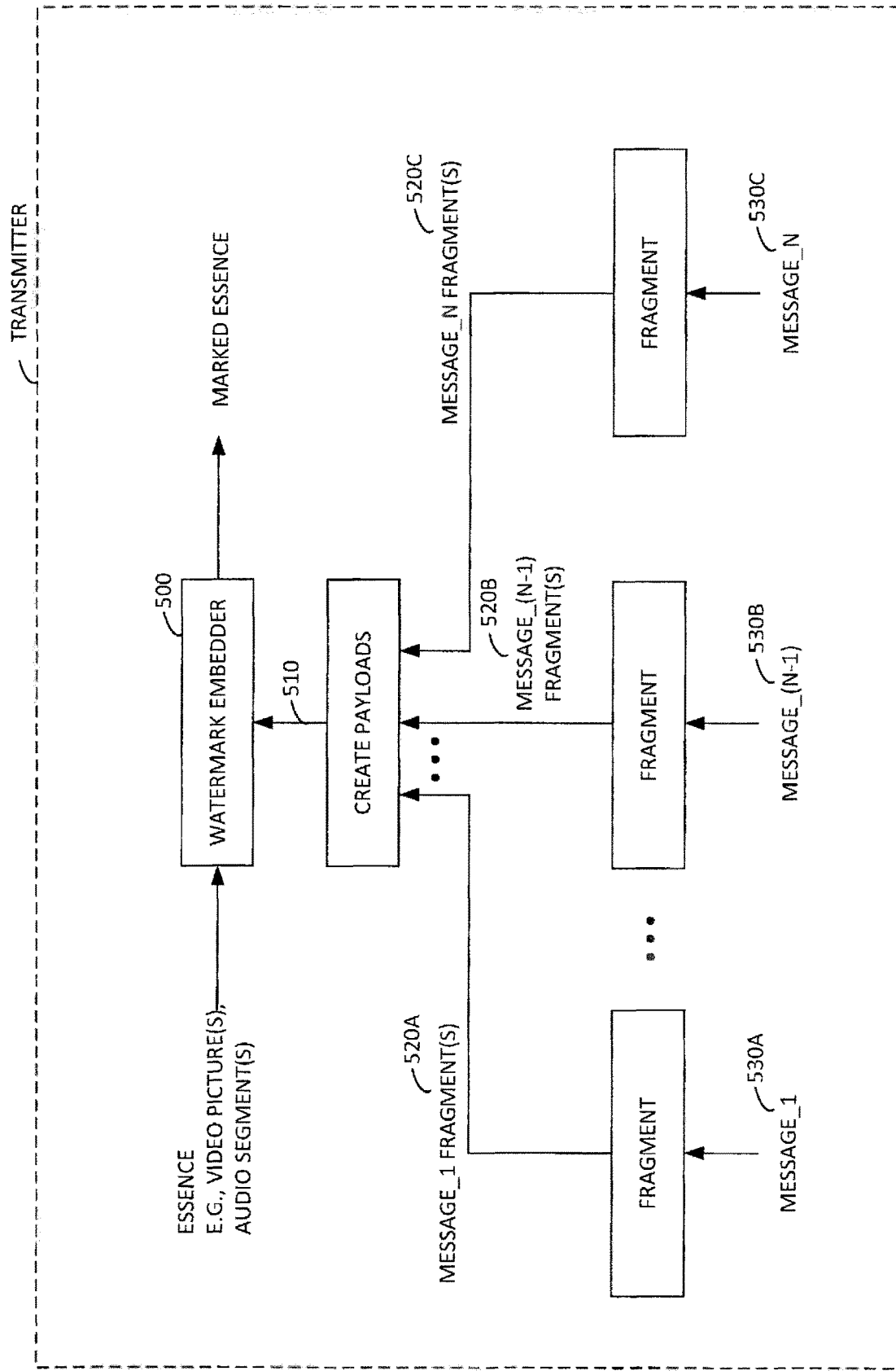
FIG. 15 illustrates a watermark embedding system.

Referring to FIG. 15, a transmitter of the system may receive one or more messages 530A, 530B, 530C that are to be embedded as a watermark into an essence (e.g., audio and/or video content). The one or more messages 530A, 530B, 530C may be packaged in the form of one or more fragments 520A, 520B, 520C. By way of example, each message may be packed in the form of a corresponding fragment. By way of example, each message may be packed in the form of one or more corresponding fragments. By way of example, a message may be partitioned each of which corresponds to a message fragment. In some cases, a message that exceeds the permitted length of a fragment may be spread into a plurality of corresponding fragments. In some cases, a long message may be spread over a plurality of corresponding fragments. In an example, each of the fragments is encoded to be transmitted only when there are no other fragments need to be transmitted. The transmitter may receive the message fragment(s) and create a series of one or more payloads 510 to be embedded within the essence. In some cases, the series may include embedding and/or sending the same message fragment(s) multiple times. In an example, one payload is embedded with one unit of the essence (e.g., one picture of the video and/or one segment of the audio). Each of the payloads 510 may include additional header and signaling information for the fragment(s). The essence, which may be for example a video picture and/or an audio segment, may be received by a watermark embedder 500 which embeds the payload 510 therein, to create a marked essence.

In an example system, it may be required that if a picture within a video segment carries a watermark then all the pictures within the video segment would carry a watermark. A receiver may then detect the loss of pictures by detecting that no watermark segment is being detected in the current video segment, whereas on an earlier occasion a picture within the video segment contained a watermark. A video segment would correspond to a group of consecutive pictures. Within a receiver a video segment may be identified by the watermark extractor by some external means.

Figure 16:
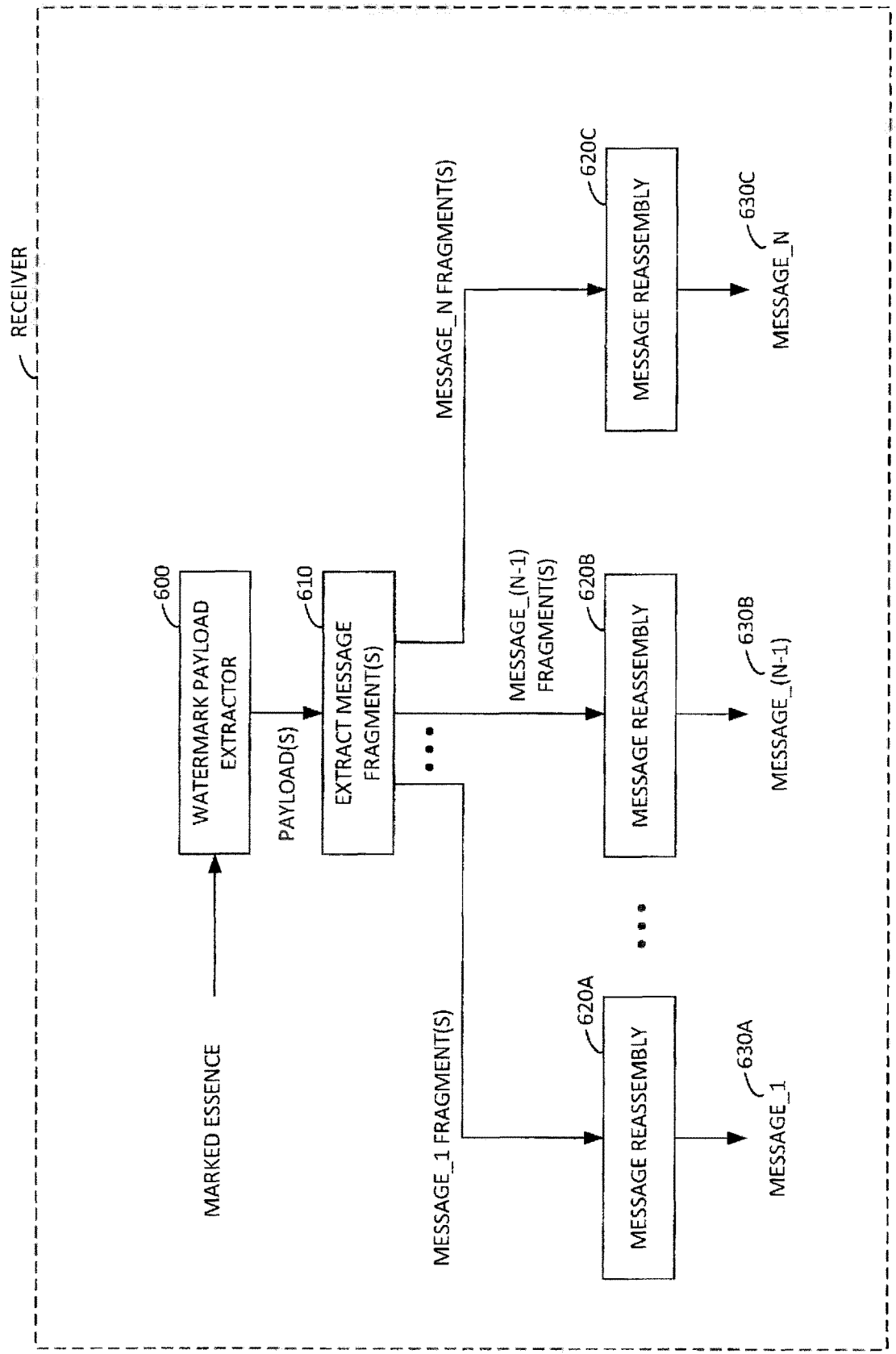
FIG. 16 illustrates a watermark extracting system.

Referring to FIG. 16, a decoder or receiver of the system may receive one or more marked essences, such as those provided by the transmitter of FIG. 15. A watermark payload extractor 600 extracts the payload(s) from the marked essence(s). One or more message fragments may be extracted 610 from the one or more payloads. The result of the extraction 610 is a series of one or more message fragments. Each of the one or more message fragments may be grouped appropriately (for e.g. using header information of the message fragment) and input to a message reassembly 620A, 620B, 620C. The result of the message reassembly 620A, 620B, 620C is a series of messages 630A, 630B, 630C. Each of the messages 630A, 630B, 630C may be the result of the reassembly of one or more fragments, which may be the result of one or more payloads, which may be the result of one or more marked essences. In an example the extracted and reassembled Message 1 (630A), . . . , Message (N–1) (630B), Message N (630C) in FIG. 16 will be respectively identical to the Message 1 (530A), . . . , Message (N–1) (530B), Message N (530C) in FIG. 15. By way of example, message reassembly may involve concatenating, in a particular order, the message data included in a group of message fragments.

In an example, a "1×" video watermark (emission format) delivers 30 bytes of payload data per video frame, while a "2×" video watermark (emission format) system delivers 60 bytes per frame. They are sometimes referred to as the 1× System and 2× System respectively.

In an example, the payload format for the video watermark is the same in both the 1× and 2× systems.

In an example payload format for the video watermark a run-in pattern is followed by one or more instances of a message block.

The message fragment may include type information that indicates the particular type of information carried in the fragment. For example, the message type may indicate that the information includes a subset of a pre-defined set of syntax elements (e.g. content identifier, media time). In some cases, the values taken on by some syntax elements may be used to determine the exact subset of syntax elements included in the message fragment. For example, the message type may indicate that the information may include a channel identifier. For example, the message type may indicate that the information may include a uniform resource identifier (URI), and a URI type. In another example, the message type may indicate that the information include a content identifier.

In an example, a message fragment may include a content identifier which may correspond to an Entertainment Identifier Registry (EIDR) In an example, a message fragment may include a content identifier which may correspond to an advertising identifier (Ad-ID) used to track advertising assets.

In an example, the message fragment may include length information about variable length information included within it.

In an example, the watermark payload may include a message.

In an example, the message can be included within one message fragment.

In an example, a watermark payload may carry one or more message fragments.

In an example, a message fragment may include length information about the variable length information included within it, for e.g. URI, Ad-ID In an example, the message fragment may include length information about a first variable length information included within the message fragment. The first variable length information may include a fixed length part and a second variable length information. The length of the second variable length information may be derived as the length of first variable length information minus the length of fixed length part. The length of the fixed length part may be derived in any suitable manner. For example, the fixed length part may be derived based upon the message type, the length of the first variable length information, the length of syntax elements belonging to a fixed length part included within the message fragment. In an example the length of part of the second variable length information included in a message fragment is derived as the length of the first variable length information minus the length of the fixed length part included in the message fragment. In an example the fixed length part included in a message fragment may not be included contiguously. In an example the fixed length part included in a message fragment may lie on either side of the second variable length information. In an example the fixed length part is only included partially within the message fragment. In an example the fixed length part may not be included within the message fragment.

In some audio-video environments it is desirable that the system has the capability to time-shift the audio-video content. Typically, this refers to recording the audio-visual content on a storage medium, such as a hard drive, and then watching the recorded show at a later time even if the recording is not yet complete. In some audio-video environments it is also desirable that the system is capable of trick mode functions, such as playback of previously recorded content, pause, pause-live, jump to next segment, jump to last segment, resume broadcast of live content, etc. In some audio-video environments it is desirable that the system has the capability to enable user preferences and interactive applications to be overridden as necessary in the event of an emergency alert. Typically, emergency alerts are important messages that originate from the federal, state, or local governments that provide emergency information, such as earthquakes, floods, and other events that are national in nature and/or regional in nature. For such emergency alerts often provided with the audio visual content, it is desirable to be able to override the graphics being displayed on AV presentation device 180, such as video overlays or other graphical content, so that the emergency alert message is presented in a manner that is readily visible on the AV presentation device. For example, in the case that the viewer is watching video content on the AV presentation device such as a television together with another window open on the AV presentation device interacting with an interactive TV application, it is desirable to override both the video content and the interactive TV application so that the emergency alert message is readily visible on the AV presentation device. Merely displaying the emergency alert message in the video content may be insufficient in some situations where the video content is obscured by another application, such as the interactive TV application. In some audio-video environments to the extent that all of the emitted broadcast services are not available to viewers from a received broadcast television service from a MVPD, such as cable, satellite, or Internet Protocol Television (IPTV) operator, the system should be capable of enabling the receivers to retrieve the missing components of the services via alterative networks (e.g., broadband network connection). Often, this may include emergency alert messages and the contents thereof, which may not be made available to a AV presentation device 180 because a broadcast receiver device 160 (e.g., set top box) receiving the audio visual content is using a high definition multimedia interface (HDMI) to the AV presentation device that only provides uncompressed audio and video information to the AV presentation device while omitting other types of components that may otherwise have been desirable to provide to the AV presentation device. It is to be understood that the AV presentation device may be any device capable of rendering audio and/or visual content, and which may be networked together in a multi-screen interactive TV session.

While presenting broadcast audio-video content that is being contemporaneously provided by a broadcaster, any emergency alert messages that are included with the audio video content, such as being embedded within a watermark included within the audio and/or video content, the AV presentation device 180 with watermark capable receiver 310 and watermark client 320 will detect and respond to the emergency alert signal. However, in the case that the viewer has time-shifted the audio-video content, when the AV presentation device 180 receives the time-shifted audio-video content together with the watermark that includes the emergency alert signal, the AV presentation device 180 will likewise detect and respond to the emergency alert signal. While such delayed detection and response may be appropriate if the shift-shifting is of a minimal duration, this may result in a disruption to the viewer experience when the time-shifting is not of a minimal duration because often the emergency alert is no longer relevant. By way of example, when the time-shifting is not of a minimal duration the AV presentation device 180 with watermark capable receiver 310 and watermark client 320 will detect and respond to the emergency alert signal which may involve modifying the video content and may involve removing any other applications that are currently being presented on the AV presentation device 180, resulting in an unnecessary disruption in the viewing experience.

Figure 17:
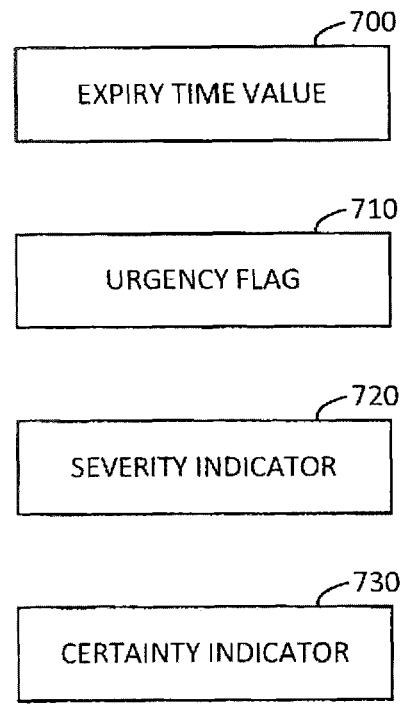
FIG. 17 illustrates an expiry time value, an urgency flag, a severity indicator, and a certainty indicator of an emergency message.

Referring to FIG. 17, it is desirable that an emergency alert watermark included within the audio and/or video content includes an expiry time value 700. The expiry time value 700 indicates a time value representative of the time extent of the corresponding emergency alert. For example, the time extent may be represented in terms of minutes in the case of audio and video watermarks, or in terms of seconds in the case of video watermarks. Preferably, the time extent is consistent with the textual content of the broadcasters' alert message. For example, a time extent until 5 PM would be appropriate for a broadcasters' alert message of "Flash Flood warning in effect till 5 pm."

It is also desirable that the emergency alert watermark included within the audio and/or video content includes an urgency flag 710. The urgency flag 710 signals to devices the extent to which immediate attention to the emergency alert is desirable. For example, if the urgency flag 710 is set then all on-screen display objects (e.g., an interactive TV application running on the AV presentation device 180, such as a television) may be cleared, even as the remainder of the emergency alert message is still being retrieved, so that the emergency alert message may be presented in a more urgent manner. For example, if the urgency flag 710 is not set, then the on-screen display objects are not necessarily cleared in such a timely manner, while the remainder of the emergency alert message is still being retrieved. In the case that the urgency flag 710 is not set, the emergency alert message may be further parsed and matched to further confirm its applicability to the current viewer. For example, the further processing may include geolocation processing to determine whether the message is applicable to the particular viewer.

It is also desirable that the emergency alert watermark included within the audio and/or video content includes a severity indicator 720. For example, the severity indicator 720 may include a range of values such as for example, extreme, severe, moderate, minor, and/or unknown. In this manner, the emergency alert signal may provide information relevant to the severity of the emergency event.

It is also desirable that the emergency alert watermark included within the audio and/or video content includes a certainty indicator 730. For example, the certainty indicator 730 may include a range of values such as for example, observed, likely, possible, unlikely, and/or unknown. In this manner, the emergency alert signal may provide information relevant to the certainty of the emergency event.

By providing the emergency alert watermark that includes the expiry time value 700, the urgency flag 710, the severity indicator 720, and/or the certainty indicator 730 enables broadcasters to flexibly signal to the receiver time-sensitive emergency alerts that are suitable for environments that include the redistribution via a MVPD broadcast receiving device 160 and/or time-shift use of audio-visual content. Preferably, the emergency alert signal that include the expiry time value 700, the urgency flag 710, the severity indicator 720, and/or the certainty indicator 730 are provided in the audio watermark and/or video watermark of the audio video content. Also, by providing the emergency alert signal that includes the expiry time value 700, the urgency flag 710, the severity indicator 720, and/or the certainty indicator 730 enables receivers to properly identify time sensitive alerts and provide a suitable response. Further, by providing the emergency alert signal that includes the expiry time value 700, the urgency flag 710, the severity indicator 720, and/or the certainty indicator 730 facilitates reducing unnecessary disruption to the viewer's experience, especially in the case of time-shifted audio video content. Moreover, by providing the emergency alert signal that includes the expiry time value 700, the urgency flag 710, the severity indicator 720, and/or the certainty indicator 730 provides information to the viewer so that the viewer may suitably respond to the emergency alert signal.

Referring to FIG. 18, the structure of the watermark message block 800 carried in the payload of watermark technology with moderate capacity such as video watermark may include a watermark message identification (wm_message_id) 802 which indicates the type of messages signaled by the watermark message block 800, such as an emergency alert signal and message. A watermark message block 800 may include a full wm_message( ) or a fragment of a wm_message( ). A table 805 may be used to select an appropriate set of watermark decoding and/or processing based upon the type of wm_message_id 802. In the case that the wm_message_id is 0x05 806 indicates that the watermark message block 800 includes an emergency alert (EA) signal and message (EA_message( )) 808. wm_message_bytes( ) includes a complete instance of the wm_message( ) identified by the value of wm_message_id when it is indicated (for e.g. via signaling) that no fragmentation is used, otherwise wm_message_bytes( ) includes a fragment of the wm_message( ). Other structures for the watermark message may likewise be used, as desired.

The structure of the EA_message( ) 808 may include one or more different data fields. The EA_message( ) 808 may include an EA_Expiry 852 that may be a 26-bit integer value that represents a Coordinated Universal Time (UTC) in minutes of granularity when the current emergency message ends. An EA_Expiry value of 0 indicates that the alert end time is unknown. In the receiving device, the UTC of the current time may be compared against the UTC of the EA_Expiry 852, which if the UTC of the current time is less than or equal to the UTC of the EA_Expiry 852 then the emergency alert event is still appropriate for being processed accordingly. In the case that the EA_Expiry 852 value is 0, indicating that the alert expiry time is unknown, then the AV presentation device 180 may automatically render the alert message. The EA_Expiry 852 corresponds to the expiry time value 700.

The EA_message( ) 808 may include an EA_Urgency 854 that may be a 1-bit value that represents the urgency of the emergency alert event. A value of 1 signals to the AV presentation device 180, such as a television, that immediate attention is preferred. A value of 0 signals to the AV presentation device 180, such as a television, that the alert is of normal urgency in nature. Such AV presentation device 180 may further propagate the signal to one or more companion devices that are currently in a networked multi-screen interactive TV session with the AV presentation device 180, such as a television. The EA_Urgency 854 corresponds to the urgency flag 710.

The EA_message( ) 808 may include an EA_message_body_present 856 that may be a 1 bit value that indicates the presence of additional data related to the EA_message 808.

The EA_message( ) 808 may include a reserve 4 bits 858 of padding for byte alignment.

The EA_message( ) 808 may include a conditional statement 860 signaling the additional data related to the EA_message 808.

The additional data may include an EA_message_ID 862 which may provides an ID for the emergency alert message.

The additional data may include an EA_message_version 864 which may provide a version number for the emergency alert message.

The additional data may include an EA_message_text_length 866 which may be an 8-bit unsigned integer that gives the length of an EA_message_text 866.

The additional data may include the EA_message_text (8*N) 868 which may be a text string of the emergency alert text.

It is to be understood that the watermark message and/or any other fields therein may be structured in any suitable manner. It is to be understood that fewer and/or greater number of bits may be used for the signaling. It is to be understood that the data is preferably received in the audio and/or video watermarking, but may likewise be obtained in any other manner.

Referring to FIG. 19, another example for signaling a watermark message within video may include replacing the reserve 4 bits 858 with an EA_Certainty_severity_code 900 which indicates the certainty and/or the severity of the corresponding emergency message.

Referring to FIG. 20, a table represents the different combinations of the certainty and severity. The certainty 1000 may include a range of values such as for example, observed, likely, possible, unlikely, and/or unknown. To represent the 5 values by two bits, the unknown and unlikely may be combined. The severity 1010 may include a range of values such as for example, extreme, severe, moderate, minor, and/or unknown. To represent the 5 values by two bits, the unknown and minor may be combined.

Figure 21:
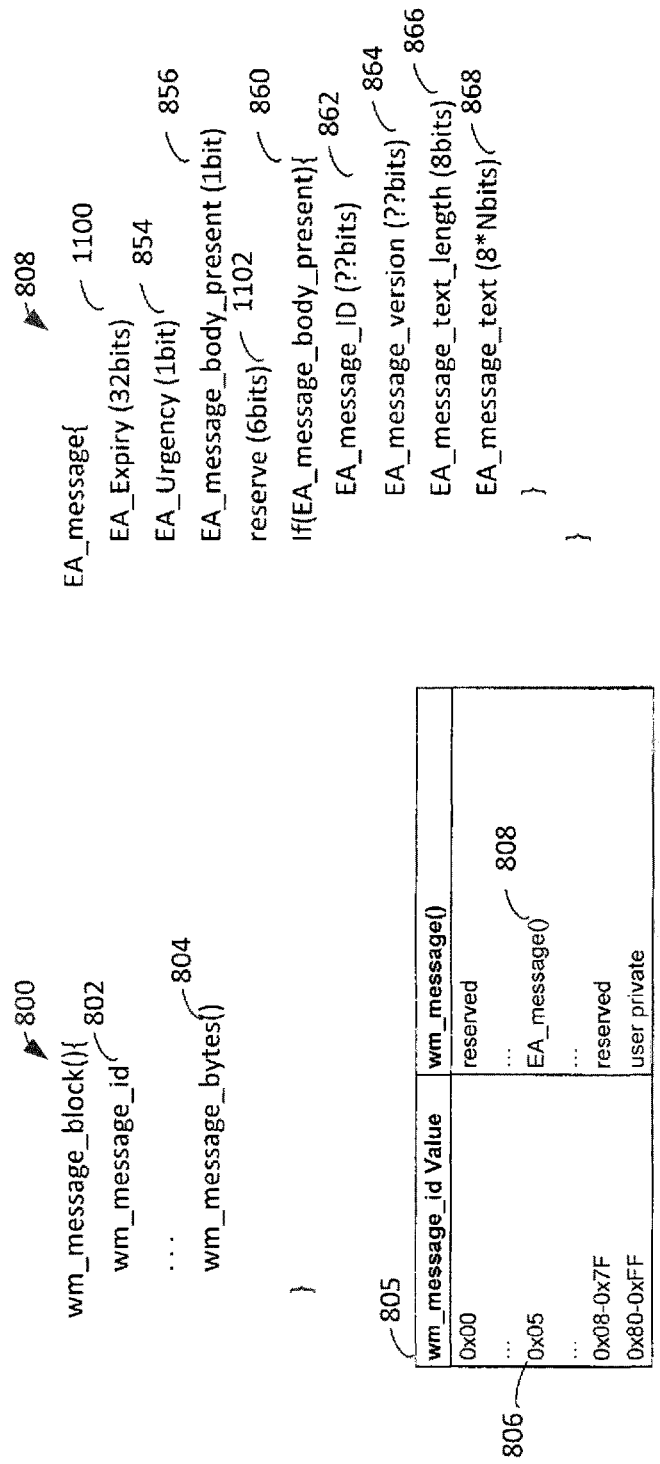
FIG. 21 illustrates another exemplary emergency alert message.

Referring to FIG. 21, another example for signaling a watermark message within video may include replacing the reserve 4 bits 858 with reserve 6 bits 1102. In addition, signaling the watermark message within the video may include replacing the EA_Expiry 852 (26 bits) with EA_Expiry 1100 (32 bits). The 32 bits provides additional granularity to more appropriately signal the UTC time code using seconds granularity.

Referring to FIG. 22, another example for signaling a watermark message within video may include replacing the reserved 6 bits 1102 with reserve 2 bits 1104. In addition, signaling the watermark message within the video may include the EA_Certainty_severity_code 900.

Figures 23, 24A:
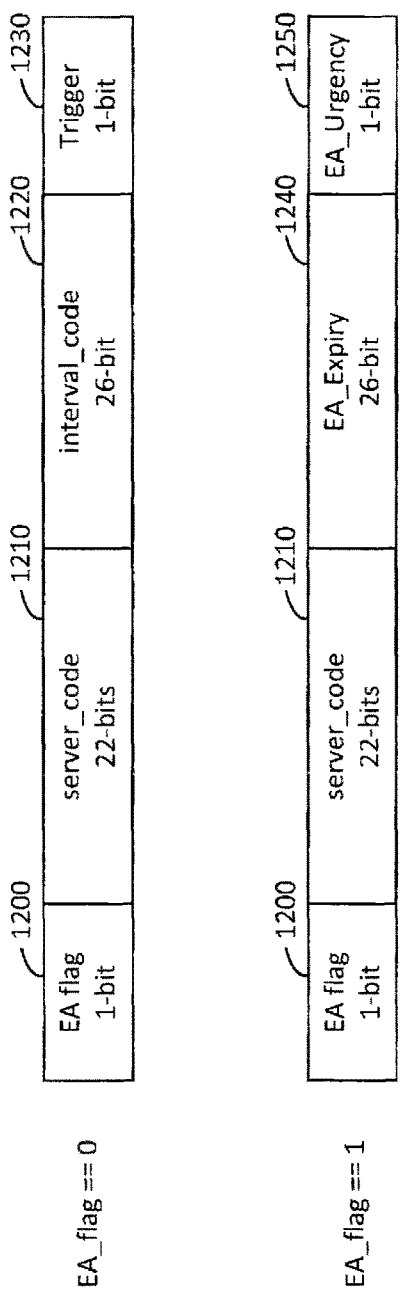
FIG. 23 illustrates another exemplary emergency alert message.
FIG. 24A illustrates an exemplary bitstream syntax of the watermark message block.

Referring to FIG. 23, the structure of the watermark message block 800 included within the watermark suitable for audio content may include an emergency alert flag (EA_flag) 1200 having 1 bit which indicates the type of messages signaled by the watermark message, such as an emergency alert signal. When the EA_flag has a value of 0 then the watermark message is not of an emergency alert type. In this case, the watermark message preferably includes a server_code 1210 which may be a 22 bit code that is used to query an audio watermark server to obtain further information regarding the non-emergency alert message. The query may be of the form "http://{server_code}.vp1.tv/atsc30/interval_code, where the interval_code 1220 indicates a timeline location in the video content corresponding to the server_code 1210. A trigger 1230 may be provided to indicate that the previous one or more server_code and/or interval_code watermark data should be executed.

When the EA_flag 1200 has a value of 1 then the watermark message is of an emergency alert type. In this case, the watermark message preferably includes the server_code 1210 which may be a 22 bit code that is used to query the audio watermark server to obtain further information regarding the emergency alert message. The query may be of the form "http://{server_code}.vp1.tv/atsc30/AEA/?zip=zipcode, where the query includes the 5-digit postal ZIP code of the AV presentation device 180 with watermark capable receiver 310 and watermark client 320 to enable the server to provide the relevant emergency alert information to the such AV presentation device. The watermark message may also include EA_Expiry 1240 which may be a 22 bit code that is used to determine the expiration time. The watermark message may also include an EA_Urgency 1250 to indicate the urgency of the watermark message in a manner similar to that of EA_Urgency 854.

A system employing the audio visual watermarking may include a requirement that broadcasters who employ such watermark technology should ensure that whenever a broadcaster signals elsewhere in the emitted signal that an EA event is in effect, then the EA flag should be correspondingly set to 1 and that the wm_message_id be correspondingly set to 0x05.

A system employing the audio visual watermarking may include a requirement that broadcasters who employ such watermark technology should ensure that whenever a broadcaster signals elsewhere in the emitted signal that there is no EA event in effect, then the EA flag should be correspondingly set to 0 and that the wm_message_id be correspondingly not set to 0x05.

FIG. 24A represents an exemplary bitstream structure of the video watermark message block (wm_message_block( )) where:

wm_message_id is a value that uniquely identifies the syntax and semantics of the data bytes carried in the message block.

wm_message_version is a 4-bit value which may be incremented if and only if anything in the wm_message( ) changes, with wrap-around to 0 after the value reaches 15.

fragment_number is a 2-bit value that specifies the number of current message fragment minus 1.

last_fragment is a 2-bit value that specifies the fragment number of the last fragment used to deliver the complete wm_message( ). A value of '00' in last_fragment indicates no fragmentation is used (the wm_message( ) contained within is complete). A value of '01' in last_fragment indicates the wm_message( ) will be delivered in two parts, a value of '10' indicates the wm_message( ) will be delivered in three parts, and a value of '11' indicates it will be delivered in four parts. The pair of values fragment_number and last_fragment may be considered to signal "part M of N."

wm_message_bytes( )—When the value of last_fragment is 0, wm_message_bytes( ) may be a complete instance of the watermark message identified by the value of wm_message_id. When the value of last_fragment is non-zero, wm_message_bytes( ) may be a fragment of that watermark message wm_message( ). The concatenation of all instances of wm_message_bytes( ) with a given wm_message_id and wm_message_version number results in the complete wm_message( ) associated with that wm_message_id. The assembly of a wm_message( ) from one or more wm_message_block( ) instances may be as illustrated in FIG. 24C. wm_message_block(i) may indicate the i-th instance e.g. corresponding wm_message_block( ) instance with fragment_number value equal to i.

FIG. 24B is an exemplary mapping of wm_message_id to wm_message( ). It is used to determine the bytes included in wm_message_bytes( ).

In an example system, fragment_number is constrained to be less than or equal to last_fragment.

FIG. 24D, represent an exemplary URI Message used to deliver URIs of various types. The URI Message may be sent in fragments (e.g. the value of last_fragment in the message header may be non-zero). The value of field uri_type identifies the type of URI. The value of field uri_strlen signals the number of characters in the URI_string( ) field to follow. The field URI_string( ) is a URI consisting of characters whose values may be restricted to those allowed for Uniform Resource Identifiers (URIs) by IETF Request for Comments (RFC) 3986 (https://www.ietf.org/rfc/rfc3986.txt) that is incorporated herein by reference. The length of the URI string (URI_string( )) may be as given by the value of uri_strlen. The character string, after reassembly, if the URI is sent in fragments, is constrained to be a valid URI per RFC 3986.

In an example, when signaling variable length fields within the video watermark the length value, say L, (e.g. in number of bytes or in number of bits) of the field may be signaled first followed by the bytes containing the data for the field. Since the capacity of a 1× and 2× system is limited, the value the length L may take on is upper bounded. More specifically the sum of the lengths of the variable length field may not exceed the capacity of largest video watermark payload length minus the length of the various fixed length fields in the video watermark payload. The fixed length fields may include the length fields for the variable length data.

Referring to FIG. 24D Since the allowed maximum value for the field uri_strlen is 255 the overall uri_message( ) may become bigger than the maximum allowed capacity of the watermark 1× or 2× system. Thus constraint is described below on the field uri_strlen to make sure the overall message can fit in the capacity of watermark message when using either 1× or 2× system. Without this constraint it is possible to create a message which can not fit in the watermark system and which can result in the receiver unable to parse the received message.

Referring FIG. 24D, the variable length field URI_string( ) is preceded by its length field uri_strlen. In an example, the value of uri_strlen field may be less than or equal to 86 for 1× video watermark emission format (1× System). In another example, the value of uri_strlen field may be less than or equal to 78 for 1× video watermark emission format (1× System).

Referring FIG. 24D, the variable length field URI_string( ) is preceded by its length field uri_strlen. In an example, the value of uri_strlen field may be less than or equal to 206 for 2× video watermark emission format (2× System). In another example, the value of uri_strlen field may be less than or equal to 198 for 2× video watermark emission format (2× System).

FIG. 25A illustrates an exemplary dynamic event message. As shown in FIG. 24B dynamic event message (dynamic_event_message( )) is one of the watermark messages.

Event is a timed notification to a receiver software or to an application indicating that some action is to be taken.

Event Stream is a Stream of events.

A broadcast station may send Events via broadcast channel or broadband to a receiver. The Events may be sent dynamically as required. As an example Events may be sent to signal to the receiver to start or stop a particular application associated with current program. Other example Events may include an event which carries some data required by a running application. These are just examples and other type of data may be sent by events.

The dynamic_event_message( ) supports delivery of dynamic Events in video watermarks. In an example the syntax and bitstream semantics of the Dynamic Event Message may be as given in FIG. 25A. Semantic description of various syntax elements in FIG. 25A maybe as shown below.

delivery_protocol_type is a 4-bit field may signify the delivery of the service to which the dynamic event applies. FIG. 25B illustrates an exemplary encoding of this field. For example the delivery protocol may be MPEG Media Transport Protocol (MMTP) or Real-time Object delivery over Unidirectional Transport (ROUTE) which may operate on top of Dynamic Adaptive Streaming of HTTP (DASH). MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. DASH is further described in "ISO/IEC 23009-1 Dynamic adaptive streaming over HTTP (DASH)—Part 1: Media presentation description and segment formats," which is incorporated by reference herein in its entirety.

scheme_id_uri_strlen is an 8-bit unsigned integer field that gives the length of the scheme_id_uri_string field in bytes.

scheme_id_uri_string is a string that gives the schemeIdUri for the Event stream of the Event. specifies a URI to identify the scheme. The semantics of this element are specific to the scheme specified by this attribute. The schemeIdUri may be a Uniform Resource Number (URN) or Uniform Resource Locator (URL). URN and URL are defined in IETF RFC 3986 available at https://tools.ietf.org/html/rfc3986 which is incorporated by reference in its entirety.

value_strlen is an 8-bit unsigned integer field gives the length of the value_string field in bytes.

value_string is a string that gives the value for the Event stream of the Event.

timescale is a 32-bit unsigned integer that gives the time scale for the Event Stream of the event, in ticks/second as defined in the MPEG DASH standard described in "ISO/IEC 23009-1 Dynamic adaptive streaming over HTTP (DASH)—Part 1: Media presentation description and segment formats", to be used for the duration field.

presentation_time is a 32-bit unsigned integer that indicates the presentation time of the Event, as the least-significant 32 bits of the count of the number of seconds since Jan. 1, 1970 00:00:00, International Atomic Time (TAI).

presentation_time_ms is a 10-bit unsigned integer in the range 0 to 999 that indicates the milliseconds offset from the time indicated in presentation_time, such that the formula presentation_time+(presentation_time_ms/1000) yields the actual presentation time to the nearest 1 millisecond.

duration is a 32-bit unsigned integer that gives the duration of the Event, in the time scale of the Event.

id is a 32-bit unsigned integer field identifier (ID) for the Event, unique within the Event Stream.

data_length is an 8-bit integer that gives the length of the data field in bytes.

data is a field that contains data needed for responding to the event, if any. The format and use of the data is determined by the Event Stream specification, which will be known to any application registering to receive the Event for any Event targeted to applications.

An extension of dynamic event message to support future extensibility is desired. The dynamic event message shown in FIG. 25A only provides syntax elements when the delivery protocol is ROUTE/DASH or MMTP. This can be seen by the use of if (delivery_protocol_type=='1'||'2'){ . . . } in FIG. 25A construct which encompasses the dynamic event related syntax elements corresponding to those two delivery protocols However in future when another delivery protocol is used the dynamic event message in FIG. 25A does not allow signaling dynamic event information for it.

An extension of dynamic event message is illustrated in FIG. 25C. In FIG. 25C additional fields are added inside a else { . . . } part towards the end of dynamic_event_message( ). These fields include "proto_reserved_field_length" and "reserved" fields. Semantics of these fields is described below.

proto_reserved_field_length is an 8-bit unsigned integer field that gives the length in bytes of the reserved field, which immediately follows this field.

reserved is a field of length proto_reserved_field_length.

In future when a new delivery protocol is defined then the bytes in reserved field can be used to signal any desired data elements.

If a previous receiver which does not know about the new delivery protocol receives such a message obeying syntax shown in FIG. 25C it can skip past the reserved field since it knows its length. If instead a new receiver which knows about the format within reserved field for the new delivery protocol receives a message obeying the syntax shown in FIG. 25C, it can parse inside the reserved field.

Thus the syntax shown in FIG. 25C provides future extensibility in a backward compatible manner.

Referring FIG. 25A and FIG. 25C, the syntax includes three variable length fields, namely: scheme_id_uri_string, value_string, data field. Each of these fields are preceded by fields (scheme_id_uri_length, value_length, data_length) which indicate length of these variable length fields. Since the allowed maximum value for each of the fields scheme_id_uri_length, value_length, data_length) is 255 the overall dynamic_event_message( ) may become bigger than the maximum allowed capacity of the watermark 1× or 2× system. Thus constraints are described below on these fields to make sure the overall message can fit in the capacity of watermark message when using either 1× or 2× system. Without these constraints it is possible to create a message which can not fit in the watermark system and which can result in the receiver unable to parse the received message.

In an example when delivery_protocol_type has a value equal to 1 or 2, sum of the value of scheme_id_uri_length field, value of value_length field and value of data_length field may be less than or equal to 66 for 1× video watermark emission format (1× System) and may be less than or equal to 186 for 2× video watermark emission format (2× System).

Otherwise when delivery_protocol_type has a value other than value 1 or 2, value of proto_reserved_field_length may be less than or equal to 87 for 1× video watermark emission format (1× System) and may be less than or equal to 207 for 2× video watermark emission format (2× System).

In another example when delivery_protocol_type has a value equal to 1 or 2, sum of the value of scheme_id_uri_length field, value of value_length field and value of data_length field may be less than or equal to 58 for 1× video watermark emission format (1× System) and may be less than or equal to 178 for 2× video watermark emission format (2× System).

Otherwise when delivery_protocol_type has a value other than value 1 or 2, value of proto_reserved_field_length may be less than or equal to 78 for 1× video watermark emission format (1× System) and may be less than or equal to 198 for 2× video watermark emission format (2× System).

In another example, the field proto_reserved_field_length may be referred to as another field name. In one example, field proto_reserved_field_length may be referred to as field reserved1_field_length.

Referring FIG. 24B, an emergency_alert_message( ) may correspond to the exemplary syntax illustrated in FIG. 26.

An exemplary semantic for the fields in FIG. 26A is listed below:

CAP_message_ID_length—This 8-bit unsigned integer field gives the length of the CAP_message_ID field in bytes.

CAP_message_ID is a string that may give the ID of the CAP message defined in OASIS: "Common Alerting Protocol" Version 1.2, 1 Jul. 2010.

http://docs.oasis-open.org/emergency/cap/v1.2/CAP-v1.2-os.pdf (which is incorporated by reference in its entirety). It may be the value of the cap.alert.identifier element of the CAP message indicated by CAP_message_url.

CAP_message_url_length is an 8-bit unsigned integer field gives the length of the CAP_message_url field in bytes.

CAP_message_url is a string that may give the URL that can be used to retrieve the CAP message.

expires is a parameter may indicate the latest expiration date and time of any <info> element in the CAP message, encoded as a 32-bit count of the number of seconds since Jan. 1, 1970 00:00:00, International Atomic Time (TAI).

urgency is a flag that when set to '1', may indicate that the urgency of the most urgent <info> element in the CAP message is "Immediate." When set to '0', it may indicate otherwise.

severity_certainty is a 4-bit field code that is derived from the values of the required CAP elements of certainty and severity. For both elements, the lowest two values have been merged. The encoding of severity_certainty may be as given in FIG. 26B.

Referring FIG. 26A, the variable length field CAP_message_ID is preceded by its length field CAP_message_ID_length. The variable length field CAP_message_url is preceded by its length field CAP_message_url_length. Since the allowed maximum value for the field CAP_message_url_length is 255 the overall emergency alert message( ) may become bigger than the maximum allowed capacity of the watermark 1× or 2× system. Thus constraint is described below on the field CAP_message_url_length to make sure the overall message can fit in the capacity of watermark message when using either 1× or 2× system. Without this constraint it is possible to create a message which can not fit in the watermark system and which can result in the receiver unable to parse the received message.

In an example, sum of the value of CAP_message_ID_length field, and value of CAP_message_url_length field may be less than or equal to 80 for 1× video watermark emission format (1× System). In yet another example, sum of the value of CAP_message_ID_length field and value of CAP_message_url_length field may be less than or equal to 73 for 1× video watermark emission format (1× System).

In an example, sum of the value of CAP_message_ID_length field, and value of CAP_message_url_length field may be less than or equal to 200 for 2× video watermark emission format (2× System). In yet another example, sum of the value of CAP_message_ID_length field and value of CAP_message_url_length field may be less than or equal to 193 for 2× video watermark emission format (2× System).

In an example, referring FIG. 26A, the expires field may not be signaled in the message. The signaling may be controlled by means of a flag for e.g. when the flag value is 0 the expires field not be signaled. When the flag value is 1 the expires field is signaled. The flag may be signaled in the emergency_alert_message( ).

In an example, referring FIG. 26A, a special value may be set aside for the expires field. The special value would indicate to that the valid expiration of the emergency_alert_message( ) is unknown. For example the special value may be a value of 0.

A system employing the audio visual watermarking may at the discretion of the broadcasters include setting the expiration times to 0 to alleviate the need to determine suitable time duration and/or ending time.

A system employing the audio visual watermarking may determine the expiration times based upon other elements included within the audio visual content or otherwise available to the display device.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method of processing a data stream comprising:
   (a) receiving said data stream including a watermark message within said data stream;
   (b) extracting a corresponding dynamic event message from said watermark message related to a dynamic event;
   (c) extracting a delivery protocol type from said dynamic event message;
   (d) determining whether said delivery protocol type has a value equal to either 1 or 2, and if said delivery protocol type has a value equal to either 1 or 2, then a sum of (i) a value of a first field, (ii) a value of a second field, and (iii) a value of a third field is less than or equal to a first threshold value for a 1× video watermark emission format and is less than or equal to a second threshold value for a 2× video watermark emission format;
   (e) based upon said determining when said delivery protocol type has a value that is not equal to 1 or 2, then a value of a reserved field length is less than or equal to a third threshold value for said 1× video watermark emission format and is less than or equal to a fourth threshold value for said 2× video watermark emission format; and
   (f) extracting an associated field based upon said reserved field length; wherein
   said 1× video watermark emission format delivers 30 bytes of data per video frame and said 2× video watermark emission format delivers 60 bytes of data per video frame.

2. The method of claim 1 wherein said watermark message is a video watermark.

3. The method of claim 1 wherein said first field is a scheme identification uniform resource identifier (id uri) field.

4. The method of claim 1 wherein said second field is a string field.

5. The method of claim 1 wherein said third field is a data length field.

6. The method of claim 1 wherein said first threshold value is 58, said second threshold value is 178, said third threshold value is 78, and said fourth threshold value is 198.

7. The method of claim 1 wherein said reserved field length is referenced as reserved1_field_length.

* * * * *